US008221717B2

(12) United States Patent
Latturner et al.

(10) Patent No.: US 8,221,717 B2
(45) Date of Patent: Jul. 17, 2012

(54) FORMULATION AND METHOD FOR IMPROVED ION EXCHANGE IN ZEOLITES AND RELATED ALUMINOSILICATES USING POLYMER SOLUTIONS

(75) Inventors: Susan E. Latturner, Tallahassee, FL (US); Gina M. Canfield, Panama City, FL (US)

(73) Assignee: Florida State University Research Foundation, Tallahassee, FL (US)

( * ) Notice: Subject to any disclaimer, the term of this patent is extended or adjusted under 35 U.S.C. 154(b) by 346 days.

(21) Appl. No.: 12/546,732

(22) Filed: Aug. 25, 2009

(65) Prior Publication Data

US 2010/0047161 A1 Feb. 25, 2010

Related U.S. Application Data

(60) Provisional application No. 61/091,576, filed on Aug. 25, 2008.

(51) Int. Cl.
*C01B 39/02* (2006.01)
(52) U.S. Cl. ......... 423/700; 423/701; 210/660; 210/679
(58) Field of Classification Search .................. 423/700, 423/701; 210/660, 679
See application file for complete search history.

(56) References Cited

U.S. PATENT DOCUMENTS

| | | | |
|---|---|---|---|
| 2,882,243 A | 4/1959 | Milton | |
| 2,882,244 A | 4/1959 | Milton | |
| 2,950,952 A | 8/1960 | Breck et al. | |
| 2,996,358 A | 8/1961 | Milton | |
| 3,008,803 A | 11/1961 | Milton | |
| 3,010,789 A | 11/1961 | Milton | |
| 3,012,853 A | 12/1961 | Milton | |
| 3,130,007 A | 4/1964 | Breck | |
| 3,140,249 A * | 7/1964 | Rosinski et al. | ......... 208/120.15 |
| 3,216,789 A | 11/1965 | Breck et al. | |
| 3,479,378 A | 11/1969 | Orlandini et al. | |
| 4,793,980 A | 12/1988 | Torobin | |
| 4,900,529 A * | 2/1990 | Sanchez et al. | ............... 423/705 |
| 5,346,924 A | 9/1994 | Giuffrida | |
| 5,531,899 A | 7/1996 | Yen et al. | |
| 5,785,947 A * | 7/1998 | Zones et al. | .................. 423/705 |
| 7,001,523 B1 | 2/2006 | Jay | |

OTHER PUBLICATIONS

Blake, N.P., et al., "Alkali-Metal Clusters as Prototypes for Electron Solvation in Zeolites," J. Inclusion Phenom. Mol. Recognit. Chem., 1995, 21, 299-324.
Canfield, Gina M., et al., "Sodalite ion exchange in polyethylene oxide oligomer solvents," J. Mater. Chem., 2007, 17, 4530-4534.
Canfield, Gina M., et al., "Transition Metal Ion Exchange using Poly(ethylene glycol) Oligomers as Solvents." (Submitted to Chemistry of Material).

(Continued)

*Primary Examiner* — David M Brunsman
(74) *Attorney, Agent, or Firm* — Sutherland Asbill & Brennan LLP

(57) ABSTRACT

Among other things, this disclosure provides a method for exchanging cations in an aluminosilicate. The method includes combining, in an exchange solvent and under ion exchange conditions, an ion-exchangeable aluminosilicate having a first cation associated therewith as a counter ion and a second cation source, to provide a mixture that includes the ion-exchanged aluminosilicate which includes the second cation associated therewith as a counter ion. Suitable exchange solvents include polyalkylene oxide glycols, polyalkylene oxide glycol monoethers, polyalkylene oxide glycol diethers, or any combination thereof.

22 Claims, 3 Drawing Sheets

OTHER PUBLICATIONS

Canfield, Gina M., et al., "Zeolite Ion Exchange and Doping in Ethylene Oxide Oligomer Solutions," Department of Chemistry & Biochemistry, Florida State University; (Poster Presentation), North American Solid State Chemistry Conference at Texas A&M University, May 17-19, 2007.

Kendrick, E., et al., "Synthesis, properties and structure of ion exchanged hydrosodalite," J. Solid State Chem., 2004, 177, 1513-1519.

Lechert, H., et al., "Investigations on the crystallization of X-type zeolites," Zeolites, 1991, 11, 720-728.

Moretti, G., Turnover frequency for NO decomposition over Cu-ZSM-5 catalysts: insight into the reaction mechanism, Catal. Lett. 1994, 28, 143-152.

Thomas, J. M., et al., "Principles & Practice of Heterogeneous Catalysis," VCH Publishers, Inc., Weinheim, 1997, pp. 26-29.

Townsend, R. P., et al., "Ion Exchange in Molecular Sieves by Conventional Techniques," Molecular Sieves: Science and Technology, vol. 3: "Post-synthesis Modification I," Published by Springer-Verlag (Berlin, Heidelberg) 2002, pp. 32-36. ISBN 3-540-64334-6.

* cited by examiner

A                               B

FORMULATION AND METHOD FOR IMPROVED ION EXCHANGE IN ZEOLITES AND RELATED ALUMINOSILICATES USING POLYMER SOLUTIONS

CROSS REFERENCE TO RELATED APPLICATION

This application claims the benefit of U.S. Provisional Application No. 61/091,576, filed Aug. 25, 2008, the disclosure of which is incorporated herein by reference in its entirety.

TECHNICAL FIELD OF THE INVENTION

This disclosure relates generally to ion-exchanged zeolites, sodalites, clay minerals, and related aluminosilicates, and methods for preparing these ion-exchanged materials.

BACKGROUND OF THE INVENTION

Porous aluminosilicate compounds such as zeolites have found utility in a variety of industrial processes such as gas separation, catalysis, and petroleum processing. Structurally, aluminosilicates include alternating $SiO_4/AlO_4$ tetrahedra linked together through bridging oxygen atoms, which create a 3-dimensional network with cages and/or channels of uniform size. These cage and channel structural features have been identified as useful for imparting the particular chemical and catalytic properties to the particular aluminosilicate.

Sodalite, shown in FIG. 1A, is a simple variant of the zeolite class of aluminosilicates. Sodalite's aluminosilicate network forms an assembly of small β-cage units in the shape of truncated octahedra, containing four and six-membered rings of alternating $SiO_4/AlO_4$ tetrahedra. The resulting β-cage stoichiometry, $[(AlSiO_4)_3]^3$, requires charge balancing cationic species within the cage. These charge balancing $M^+$ cations are $Na^+$ in natural sodalite, which occupy a single crystallographic site, coordinated to the framework oxygen atoms in the six-membered rings, as illustrated in FIG. 1B. In hydrosodalite, $Na_6(AlSiO_4)_6 \cdot 8H_2O$, each cage contains three $Na^+$ cations and four water molecules (the formula reflects the crystallographic unit cell which consists of 2 β-cage units). In dehydrated sodalite, $Na_6(AlSiO_4)_6$, all water molecules are removed from the cages.

Sodalites, like more complex aluminosilicate zeolites, able to exchange their associated charge balancing cations with other cations, a process that is traditionally carried out in aqueous solution. These cation-exchanged aluminosilicate reactions generally are undertaken to alter or tailor the properties of the particular aluminosilicate to achieve a desired activity or structural feature. However, when using aqueous ion exchange methods, sodalite and various other zeolites may tend to exchange hydronium ($H_3O^+$) ions from hydrolyzed water or from acidic hydrated metal complexes that can form with transition metal and rare earth cations in aqueous solution. This process, in turn, can lead to the breakdown of the aluminosilicate framework and/or can produce undesirable metal hydroxide precipitates on the surface of the aluminosilicate.

Therefore, new methods for effecting cation-exchange reactions and processes that are applicable to sodalite and various other zeolites, and other types of aluminosilicates, are needed that may be less susceptible to side reactions and produce fewer adverse byproducts. Further, generally more robust ion exchange methods are needed to produce the desired ion exchanged materials. Desirably, such methods would be useful with a variety of zeolites or other aluminosilicates. Therefore, there remains a need for new methods and new synthetic approaches for preparing cation-exchanged aluminosilicates.

SUMMARY OF THE INVENTION

One advantageous feature of many crystalline aluminosilicates such as zeolites is that they are ion-exchangeable. That is, the cations in the aluminosilicate or zeolite that balance the electronegative charge of the crystalline framework are replaceable with other cations. Crystalline aluminosilicates, whether naturally-occurring or synthetically prepared, are usually in the sodium form, and it is often advantageous to remove the sodium ions and replace them with other cations. For example, the sodium form of Zeolite Y has been described as inactive when used as a catalyst for cracking hydrocarbons. Accordingly, it is desirable to replace the sodium with rare earth cations or hydrogen ions, or both, in order to stabilize the zeolite for catalytic cracking purposes.

Among other things, this disclosure provides for methods and techniques for using polymer or oligomer salt or ion solutions for improving ion exchange in a variety of aluminosilicate materials. Thus, in one aspect, the disclosed methods encompass exchange methods in zeolites, sodalites, clay minerals, or similar aluminosilicate materials, collectively referred to as "aluminosilicates," in a polymeric solvent to facilitate or enhance ion exchange with the aluminosilicate and cations from any cation source. Thus, suitable aluminosilicates may be layered or porous. Generally, the methods disclosed here may facilitate ion exchange and provide a more rapid exchange process, a more complete exchange process, a higher yield exchange process, an exchange process that can be effected under less forcing conditions, an exchange process with fewer undesirable by-products, an exchange process with less harmful by-products, or any combination thereof.

According to one aspect of this disclosure, there is provided a method for exchanging cations in an aluminosilicate, comprising:

a. providing an ion-exchangeable aluminosilicate comprising a first cation associated with the aluminosilicate as a counter ion;

b. providing a second cation source comprising a second cation different from the first cation;

c. providing an exchange solvent comprising a polyalkylene oxide glycol, a polyalkylene oxide glycol monoether, a polyalkylene oxide glycol diether, or any combination thereof; and d. combining the ion-exchangeable aluminosilicate and the second cation source in the exchange solvent under ion exchange conditions, to provide a mixture comprising the ion-exchanged aluminosilicate comprising the second cation associated with the aluminosilicate as a counter ion.

If desired, the exchange step d can be repeated any number of times, using the isolated ion-exchanged aluminosilicate and a fresh solution with additional second cation source, to achieve higher levels of incorporation of the second cation into the aluminosilicate.

The exchange solvent provided in this disclosure is referred to general as a "polyether," a term which is intended to encompass glycols, glycol monoethers, and glycol diethers of polyethers. Therefore, polyalkylene oxide glycols, polyalkylene oxide glycol monoethers, polyalkylene oxide glycol diethers, are all encompassed in the methods of this disclosure. The terms "polymer" is used to include "oligomers" of any molecular weight, and these terms are used interchangeably throughout. In one aspect, for example, according to one aspect of this disclosure, the exchange solvent can comprise a polyether having the formula:

$R^1O[(CH_2)_mCHR^2O]_nR^1$, wherein $R^1$ in each occurrence is H or a $C_1$-$C_{12}$ alkyl;
$R^2$ in each occurrence is H or a $C_1$-$C_{12}$ alkyl;
m is an integer from 1 to 10, inclusive; and
n in each occurrence is an integer from 1 to 30, inclusive.

According to one aspect of this disclosure, there is provided an aluminosilicate ion exchange composition, comprising:

a. an ion-exchangeable aluminosilicate comprising a first cation associated with the aluminosilicate as a counter ion;
b. a second cation source comprising a second cation to be exchanged, the second cation different from the first cation; and
c. an exchange solvent comprising a polyalkylene oxide glycol, a polyalkylene oxide glycol monoether, a polyalkylene oxide glycol diether, or any combination thereof.

One aspect of this disclosure encompasses a general process that can be used or adapted for the preparation of a diverse range of cation-exchanged materials, including for example, transition metal-exchanged, lanthanide-exchanged, actinide-exchanged, alkali metal-exchanged, and alkaline earth metal-exchanged aluminosilicate materials. This general process can be described, and its effectiveness demonstrated, by disclosing in detail the exchange process with zeolite and sodalite formulations in a polymeric solvent, using lithium ion as the exchanging ion. Using sodalite as the example, this process can be described generally according to Eqn. 1, wherein "Li$^+$(olig)" refers to the oligomer-solubilized Li$^+$ ions.

$$Na_6(AlSiO_4)_6 \cdot nH_2O(s) + Li^+(olig) \leftrightarrows Na_{6-x}Li_x(AlSiO_4)_6 \cdot nH_2O(s) + Li_{1-x}Na_x^+(olig) \quad (1)$$

Examples of suitable solvent oligomers include, but are not limited to, low molecular weight polyethylene glycol, polyethylene glycol methyl ether, diglyme, tetraglyme, and polypropylene glycol. These oligomers, which differ in chain length and end groups, coordinate around the lithium ion with their ether and hydroxyl oxygen atoms through ion-dipole interactions, mobilize the ion, and allow it to ion exchange. Large amounts of lithium ion were successfully incorporated into the sodalite using these solvents, even under anhydrous conditions, indicating that these are suitable media for zeolite ion exchange in the absence of water. Thus, the solvent systems disclosed here allow for efficient anhydrous ion exchange, which has utility in zeolite ion exchange chemistry.

DETAILED DESCRIPTION OF THE INVENTION

Figure 1:
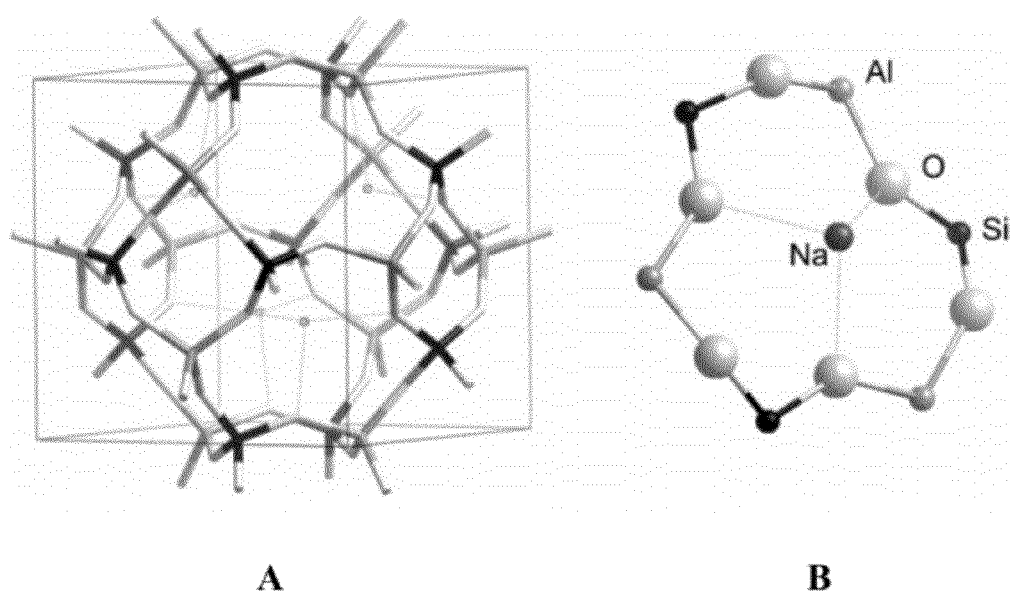
FIG. 1 illustrates a sodalite unit cell and β-cage structure, and the cation coordination environment in the six-membered ring windows of the cage.

Among other things, this disclosure provides for synthetic methods of ion exchange in zeolites, sodalites, clay minerals, and related aluminosilicate materials, and compositions resulting therefrom. In conventional ion-exchange methods for these materials, exchange of the aluminosilicate's associated and charge balancing cations has been conventionally carried out in aqueous solution. However, aqueous ion exchange methods can undesirably introduce acid from hydrolyzed water or from acidic hydrated metal complexes which, in turn, can breakdown the aluminosilicate framework or deposit metal hydroxide on the surface of the aluminosilicate. Other exchange media such as polar organic solvents, various mixed solvent systems, and non-aqueous solvents such as liquid ammonia, and even molten salt solvent systems carry their own thermodynamic or kinetic problems, or require special or extreme conditions that are undesirable.

In one aspect, this disclosure provides for methods for cation exchange with zeolites, sodalites, clay minerals, and other aluminosilicates, using polymeric solvents such as polyethylene oxides, to address some of the limitations of previous exchange methods. In this aspect, for example, unless otherwise specified, each of the ion-exchangeable aluminosilicate, the second cation source, and the exchange solvent can be selected independently of each other, from among all the disclosed possibilities. The basic synthetic method is demonstrated using sodalite in which its sodium ions are exchanged with lithium ions in polyethylene oxide solvents. This basic method is used and adapted for transition metal and rare earth exchanged zeolites and aluminosilicates, which are of interest at least for their potential utility in catalysis and optical devices.

Ion Exchange Methods and Materials

One aspect of this disclosure encompasses a general process that can be used or adapted for the preparation of a diverse range of cation-exchanged materials, including for example, transition metal-exchanged, lanthanide-exchanged, actinide-exchanged, alkali metal-exchanged, and alkaline earth metal-exchanged aluminosilicate materials. This general process can be described, and its effectiveness demonstrated, by describing in detail the exchange process with zeolite and sodalite formulations in a polymeric solvent, using lithium ion as the exchanging ion. Lithium has previously been observed to exchange poorly into sodalites. While not bound by theory, it is believe that lithium's poor exchange behavior may result from its strong hydration sphere. Lithium's ion exchange process described here can be generally used or adapted for the preparation of transition metal-exchanged and rare earth ion-exchanged materials in processes that exhibit some similar features. Lithium ion exchange is described in detail for both hydrosodalite and dehydrated sodalite compositions, using several different PEO oligomer solvents, and monitoring the results over several exchange cycles.

In these exemplary ion exchange methods, Examples 1 and 2 provide the preparative methods for the starting "hydrated" or hydrosodalite (Na$_6$(AlSiO$_4$)$_6 \cdot$8H$_2$O) and dehydrated sodalite (Na$_6$(AlSiO$_4$)$_6$), respectively. Examples 3 and 4 detail the ion exchange method according to this disclosure, for hydrosodalite and dehydrated sodalite, respectively. The exchange processes on these materials illustrate the method that is applicable to any aluminosilicate materials, including but not limited to, zeolites, sodalites, clay minerals, or similar aluminosilicate materials.

Aluminosilicates

A wide range of zeolites, sodalites, clay minerals, and other aluminosilicates, can be employed in the process disclosed herein. For example, a range of aluminosilicate zeolites, including those that occur naturally, are encompassed in this disclosure and can be used in this process. Examples of zeolites that can be ion-exchanged according this disclosure include, but are not limited to, analcime, brewsterite, chabazite, clinoptilolite, erionite, faujasite, ferrierite, gismondine, gmelinite, mesolite, mordenite, natrolite, offretite, phillipsite, paulingite, scolecite, stilbite, and thomsonite. Many of these naturally-occurring zeolites may also be prepared synthetically, and the process described herein can be used for either the naturally-occurring or the synthetically prepared zeolites.

Moreover, synthetic zeolites also can be ion-exchanged according to the disclosed process. For example, the following synthetic zeolites, which can be used and ion-exchanged as provided herein, are listed along with the U.S. patents that disclose at least one method for their synthesis; in each case, the listed U.S. patents are incorporated herein by reference in their relevant portions to describe the synthesis: Zeolite A (U.S. Pat. No. 2,882,243), Zeolite B (U.S. Pat. No. 3,008,803), Zeolite F (U.S. Pat. No. 2,996,358), Zeolite H (U.S. Pat. No. 3,010,789), Zeolite L (U.S. Pat. No. 3,216,789), Zeolite T (U.S. Pat. No. 2,950,952), Zeolite W (U.S. Pat. No. 3,012,853), Zeolite X (U.S. Pat. No. 2,882,244), and Zeolite Y (U.S. Pat. No. 3,130,007). Many other synthetic zeolites may be prepared by methods known in the art, including, for example, Zeolite Omega, Zeolite ZSM-5, Zeolite ZSM-4, Zeolite P, Zeolite N, Zeolite D, Zeolite O, Zeolite S, and Zeolite Z.

One additional aspect of this disclosure is that, unless otherwise specified, each of the ion-exchangeable aluminosilicate, the second cation source, and the exchange solvent can be selected independent of each other, from among all the disclosed possibilities. For example, in one aspect, second cation sources comprising $Mn^{2+}$, $Fe^{2+}$, $Co^{2+}$, $Ni^{2+}$, $Pt^{2+}$, $Cu^{2+}$, $Nd^{3+}$, or $Er^{3+}$ can be used for exchange into any disclosed ion-exchangeable aluminosilicates. In a further aspect, second cation sources comprising $Mn^{2+}$, $Fe^{2+}$, $Co^{2+}$, $Ni^{2+}$, $Pt^{2+}$, $Cu^{2+}$, $Nd^{3+}$, or $Er^{3+}$ can be used for exchange into any disclosed ion-exchangeable aluminosilicates except for sodalite, Zeolite X, or a combination thereof.

Also by way of example, in one aspect, second cation sources comprising $Pt^{2+}$ or $Ba^{2+}$ can be used for exchange into any disclosed ion-exchangeable aluminosilicates. In a further aspect, second cation sources comprising $Pt^{2+}$ or $Ba^{2+}$ can be used for exchange into any disclosed ion-exchangeable aluminosilicates except for Zeolite L.

In a further example, in one aspect, second cation sources comprising $Er^{3+}$, $Tb^{3+}$, $Nd^{3+}$, $Yb^{3+}$, $Eu^{3+}$, or $Eu^{2+}$ can be used for exchange into any disclosed ion-exchangeable aluminosilicates. In a further aspect, second cation sources comprising $Er^{3+}$, $Tb^{3+}$, $Nd^{3+}$, $Yb^{3+}$, $Eu^{3+}$, or $Eu^{2+}$ can be used for exchange into any disclosed ion-exchangeable aluminosilicates except for any one of, or any combination of, analcime, brewsterite, chabazite, clinoptilolite, erionite, faujasite, ferrierite, gismondine, gmelinite, mesolite, mordenite, natrolite, offretite, phillipsite, paulingite, scolecite, stilbite, thomsonite, Zeolite A, Zeolite B, Zeolite F, Zeolite H, Zeolite L, Zeolite T, Zeolite W, Zeolite X, Zeolite Y, Zeolite Omega, Zeolite ZSM-5, Zeolite ZSM-4, Zeolite P, Zeolite N, Zeolite D, Zeolite O, Zeolite S, or Zeolite Z.

Also by way of example, in another aspect, second cation sources comprising $Li^+$, $Mn^{2+}$, or $Er^{3+}$ can be used for exchange into any disclosed ion-exchangeable aluminosilicates. In a further aspect, second cation sources comprising $Li^+$, $Mn^{2+}$, or $Er^{3+}$ can be used for exchange into any disclosed ion-exchangeable aluminosilicates except for Zeolite Y, Zeolite ZSM-5, or a combination thereof.

Ion-exchangeable, layered aluminosilicates such as clay minerals can also be ion exchanged using the methods disclosed herein. As used herein, the terms "layered material," "clay," and "clay mineral" are used interchangeably to describe the class of hydrous silicate and aluminosilicate inorganic minerals with sheet-like structures, formed of a plurality of adjacent bound layers or plates usually with a high aspect ratio, and typically characterized by very high surface areas. Because these layered materials include charge-balancing cations in the interstices between the layers, ion-exchange reactions according to the disclosure also can be effected with these materials. Through exchanging their cations in the interlayer spaces by intercalation, whether partially or substantially completely, using new cations according to the disclosed methods, intercalated layered materials may retain the order or uniformity in layer spacing and/or layer position, or alternatively, a different order or uniformity in layer spacing and/or layer position may result upon ion exchange.

Clays encompass the large group of finely-crystalline, sheet like materials that are found in nature in fine-grained sediments, sedimentary rocks, and the like. Typical clays have a layered structure with a gap of about 0.1 nm between each layer and cations such as $K^+$ and $Na^+$ on the surface of each layer, which engage in an ionic interaction with the negatively charged surface of the clay layers. Exemplary clays suitable for the present invention include, but are not limited to, synthetic mica; smectites such as montmorillonite (Bentonite), sodium montmorillonite, magnesium montmorillonite, calcium montmorillonite, beidellite, nontronite, hectorite, sodium hectorite, saponite, synthetic saponite, and sauconite; pyrophyllite; glauconites; vermiculites; polygorskines; sepiolites; allophanes; imogolites; talc; mica; fluoromica; illites; glauconite; volkonskoite; sobockite; stevensite; svinfordite; magadiite; kenyaite; kaolinite; dickite; nacrite; anauxite; ledikite; montronite; halloysite; metahalloysite; sericite; allophone; serpentine clays; chrysotile; antigorite; attapulgite; sepiolite; palygorskite; Kibushi clay; gairome clay; hisingerite; chlorite; and the like, including any combinations or mixtures thereof.

Polyether Exchange Solvent Systems

In one aspect and in any embodiment, suitable solvents for the exchange methods ("exchange solvents") according to this disclosure include any glycol, glycol monoether, and/or glycol diether of any polyalkylene oxide. Accordingly, suitable exchange solvents may be selected from a polyalkylene oxide glycol, a polyalkylene oxide glycol monoether, a polyalkylene oxide glycol diether, or any combination or combinations thereof. The general term "polyether" is used herein to include all of these classes of solvents, and thus to refer to the glycols, glycol monoethers, and glycol diethers of any polyalkylene oxide. While not bound by theory, it is likely that the combination of the polyether coordination environment, as well as the higher exchange temperatures provided by their higher boiling points as compared to small molecule solvents such as water, ethers, or alcohols, may help impart utility.

The terms "solvent," "exchange solvent," and the like do not imply or require that all of the other, generally solid, components of the exchange mixture are soluble or partially soluble in that "solvent", or that any particular component of the mixture is soluble in more than trace concentrations or amounts. Thus, the "solvents" used in the disclosed exchange methods are described as such because they are fluid under some conditions at which the combination of components takes place, and generally, one or more components of the exchange mixture is soluble, partially soluble, or soluble in trace amounts under these conditions.

General polyethers that have found utility in the disclosed processes include those having the following general formula:

$R^1O[(CH_2)_mCHR^2O]_nR^1$, wherein $R^1$ in each occurrence is H or a $C_1$-$C_{12}$ alkyl;
$R^2$ in each occurrence is H or a $C_1$-$C_{12}$ alkyl;
m is an integer from 1 to 10, inclusive; and
n in each occurrence is an integer from 1 to 30, inclusive.

Thus, this general formula encompasses glycols, glycol monoethers, and glycol diethers of a number of polyalkylene oxides. These polyethers can be used alone, in combinations with other polyethers, or in combination any other suitable solvent. Such combination polyether solvent mixtures can be advantageous when employing high molecular weight polyethers, which may allow the fluid nature of the reaction mixture to be maintained over a wider range of conditions.

Polyalkylene Oxide Glycol Exchange Solvents

In one aspect, suitable polyalkylene oxide glycols include, but are not limited to, the polyethylene oxide glycols and polypropylene oxide glycols of various molecular weights. Examples of suitable polyethylene oxide glycols that can be used in the disclosed process include, but are not limited to, polyethylene glycol 200, 300, 400, 600, 1000, 1450, 3350, 4000, or even higher PEGs, which can be used alone, in combinations with other polyethers, or in combination any other suitable solvent. Such combination solvents may be desirable when employing high molecular weight polyethers.

General polyalkylene oxide glycols that have found utility in the disclosed processes include those having the formula $HO[CH_2CH_2O]_nH$, $HO[CH_2CHR^2O]_nH$, or any combination thereof, wherein:

$R^2$ in each occurrence is a $C_1$-$C_{12}$ alkyl; and
n in each occurrence is an integer from 1 to 30, inclusive.

In one aspect of this disclosure, suitable exchange solvents can be selected from $HO[CH_2CH_2O]_nH$ or $HO[CH_2CHCH_3O]_nH$, and similar oligomers, or any combination thereof, in which the average value of n in each occurrence may be independently from about 1 to about 30. In these formulas, the average value of n in each occurrence may be from about 1 to about 25; alternatively, from about 1 to about 20; alternatively, from about 1 to about 15; alternatively, from about 2 to about 12; alternatively, from about 2 to about 10; or alternatively, from about 3 to about 9.

Specific examples of useful polyalkylene oxide glycols include polyethylene glycol 600 ($HO[CH_2CH_2O]_nH$, n~12-14) and polypropylene glycol 400 ($HO[CH_2CH(CH_3)O]_nH$, n~6-7), and any combinations thereof. However, PEGs and PPGs of lower or higher average molecular weights can also be employed, including any combinations of these.

In another aspect, other suitable polyalkylene oxide glycols include the polypropylene oxide glycols (or PPGs), for example, the DOW® P™ series of polypropylene oxide glycols and their equivalents available from different sources. Thus, examples of suitable polypropylene oxide glycols include, but are not limited to, P1000TBT™ (molecular weight 1000), P1200™ (molecular weight 1200), P2000™ (molecular weight 2000), P3000TB™ (molecular weight 3000), P4000™ (molecular weight 1000), and the like, including their equivalents, and including any combination thereof.

In a further aspect and in any embodiment, suitable polyalkylene oxide glycols include the copolymers of ethylene oxide and propylene oxide, referred to simply as polyglycol copolymers, constitute suitable exchange solvents for the disclosed methods. Examples of suitable polyglycol copolymers include, but are not limited to the DOW® EP™ series of polyglycols or their equivalents available from different sources. Thus, examples of suitable copolymers of ethylene oxide and propylene oxide include, but are not limited to, DOW®'s polyglycol EP 530™ (molecular weight 2000), polyglycol EP 436™ (molecular weight 2250), polyglycol EP 1730)™ (molecular weight 2500), polyglycol 15-200™ (molecular weight 2600), polyglycol EP 1660™ (molecular weight 3900), and the like, including their equivalents, and including any combination thereof.

In still a further aspect and in any embodiment, suitable polyalkylene oxide glycol solvents include those that contain more than two terminal hydroxyl groups, such as the glyceryl ether polymers. Examples of glyceryl ether polymers include, but are not limited to, the DOW® PT™ series of polyglycols or their equivalents available from different sources, which are glyceryl ether polymers containing three terminal hydroxyl groups. For example, suitable polyglycols that can be used according to this disclosure include, Polyglycol PT250™ (molecular weight 250), Polyglycol PT700™ (molecular weight 700), Polyglycol PT3000™ (molecular weight 3000), and the like, including their equivalents, and including any combination thereof In some aspects, suitable polyalkylene oxide glycols do not require the polyethylene oxide backbone. For example, in addition to the polyethylene oxide glycols and polypropylene oxide-1,2-glycols described above, further examples of suitable polyalkylene oxide glycol exchange solvents include, but are not limited to, polypropylene oxide-1,3-glycols, polybutylene oxide-1,2-glycols, polybutylene oxide-1,4-glycols, poly-pentylene oxide-1,2-glycols, poly-hexamethylene oxide-1,6-glycols, polyheptamethylene oxide-1,7-glycols, polyoctamethylene oxide-1,8-glycols, polynonamethylene oxide-1,9-glycols, and the addition compounds of ethylene oxide and propylene oxide, optionally in block mixed form.

Polyalkylene Oxide Glycol Monoether Exchange Solvents

Polyalkylene oxide glycol monoethers are also suitable solvents for the exchange reactions of this disclosure. In this aspect, for example, suitable exchange solvents can comprise a polyalkylene oxide glycol monoether having the formula $HO[CH_2CH_2O]_nR^1$, $HO[CH_2CHR^2O]_nR^1$, or any combination thereof, wherein:

$R^1$ in each occurrence is a $C_1$-$C_{12}$ alkyl;
$R^2$ in each occurrence is a $C_1$-$C_{12}$ alkyl; and
n in each occurrence is an integer from 1 to 30, inclusive.

In any disclosed embodiment, examples of suitable polyalkylene oxide glycol monoether exchange solvents include, but are not limited to, the polyethylene glycol methyl ethers and the polypropylene glycol methyl ethers. In this aspect, suitable polyalkylene oxide glycol monoethers include polyethylene glycol methyl ether 750 ($HO[CH_2CH_2O]_nCH_3$, n~15-17), and analogous polyethylene glycol methyl ethers of lower or higher average molecular weights, and any combinations thereof.

Polyalkylene Oxide Glycol Diether (Glyme) Exchange Solvents

Polyalkylene oxide glycol diethers, which are also generically termed "glymes," are also suitable solvents for the exchange reactions of this disclosure. Thus, when the context allows, "glymes" can be a generic term to refer to the class of polyalkylene oxide glycol diethers; alternatively, the term "glyme" can refer to monoglyme, which is monoethylene glycol dimethyl ether, also called dimethoxyethane or "DME."

In this aspect, suitable exchange solvents can comprises a polyalkylene oxide glycol diether (a glyme) having the general formula $R^1O[CH_2CH_2O]_nR^1$, $R^1O[CH_2CHR^2O]_nR^1$, or any combination thereof, wherein:

R¹ in each occurrence is a $C_1$-$C_{12}$ alkyl;
R² in each occurrence is a $C_1$-$C_{12}$ alkyl; and
n in each occurrence is an integer from 1 to 30, inclusive.

In this aspect, examples of polyalkylene oxide glycol diethers include, but are not limited to, those having the formula $H_3CO[CH_2CH_2O]_nCH_3$, for example, monoethylene glycol dimethyl ether (monoglyme or DME), diethylene glycol dimethyl ether (diglyme), triethylene glycol dimethyl ether (triglyme), tetraethylene glycol dimethyl ether (tetraglyme), polyglycol DME 200 (n~4-5), polyglycol DME 250 (n~3-8), polyglycol DME 500 (n~6-16), polyglycol DME 1000 (n~22), polyglycol DME 2000, and the like. Particularly useful polyalkylene oxide glycol diethers include diglyme ($H_3CO[CH_2CH_2O]_2CH_3$), triglyme ($H_3CO[CH_2CH_2O]_3CH_3$), tetraglyme ($H_3CO[CH_2CH_2O]_4CH_3$), pentaglyme ($H_3CO[CH_2CH_2O]_5CH_3$), hexaglyme ($H_3CO[CH_2CH_2O]_6CH_3$), and/or combinations thereof. In one aspect, monoglyme itself, also known as dimethoxyethane (DME) can be used as a suitable solvent in the disclosed exchange reactions. Each of these exemplary diethers can be described structurally as "difunctional" polyalkylene oxides, but this disclosure also provides for the use of other "polyfunctional" polyalkylene oxides, in the case of certain branched, star, and comb polyalkylene oxides having more than two terminal ether moieties.

Other suitable polyalkylene oxide glycol diether exchange solvents include, but are not limited to, those having the general formula $H_3CO[CH_2CHCH_3O]_nCH_3$, for example, dipropylene glycol dimethyl ether (n=2). Other suitable glymes are those dipropylene glycol dimethyl ethers (DPGDMEs, generally) of this general formula $H_3CO[CH_2CHCH_3O]_nCH_3$, in which the average value of n can be about 3, about 4, about 5, about 6, about 7, about 8, or about 9, and the like, for example, dipropylene glycol dimethyl ethers (DPGDME).

In a further aspect, additional suitable polyalkylene oxide glycol diether exchange solvents include, but are not limited to, the butyl glymes such as, glymes having the general formula $H_3CCH_2CH_2CH_2O[CH_2CH_2O]_nCH_2CH_2CH_2CH_3$. Examples of suitable butyl glymes include, but are not limited to, diethylene glycol dibutyl ether, where n=2 (butyl diglyme), and polyethylene glycol dibutyl ether MW 300 (such as Polyglycol BB™ 300 from Clariant Corporation), where n~3-5.

This disclosure further provides for the use of solvent mixtures, including combinations of any two or more solvents disclosed herein. Thus, in any embodiment, any combination of more than one polyalkylene glycol, any combination of more than one glyme, or any combination of at least one polyalkylene glycol and at least one glyme, are encompassed. These combinations may be used in any single exchange step or in any number of exchange steps in an exchange sequence, and/or solvent combinations may be used in some exchange steps but not others.

In one additional aspect of this disclosure, suitable exchange solvents can be selected from $HO[CH_2CH_2O]_nH$, $HO[CH_2CH_2O]_nCH_3$, $H_3CO[CH_2CH_2O]_nCH_3$, $HO[CH_2CHCH_3O]_nH$, $HO[CH_2CHCH_3O]_nCH_3$, $H_3CO[CH_2CCH_3O]_nCH_3$, or any combination thereof, wherein the average value of n in each occurrence may be independently from about 1 to about 30. In any of these formulas, the average value of n in each occurrence may be independently from about 1 to about 25; alternatively, from about 1 to about 20; alternatively, from about 1 to about 15; alternatively, from about 2 to about 12; alternatively, from about 2 to about 10; or alternatively, from about 3 to about 9.

Exchange Cations

One aspect of this disclosure provides for a compound, complex, or material that supplies the cation to be exchanged with the cation already associated with the aluminosilicate (typically $Na^+$). This cation to be exchanged is also referred to herein as the "second" cation, to distinguish it from the "first" cation already associated with the aluminosilicate material as a counter ion. Thus, the "cation source" and "second cation source" are used interchangeably in this disclosure, as the context allows. In one aspect and in any embodiment, the disclosed process encompasses the use of a second cation source comprising an alkali metal, an alkaline earth metal, a transition metal, a lanthanide metal, an actinide metal, and any complex cations containing any of these metals, or any combination thereof, any of which can be exchanged with the aluminosilicate counter ion according to the described methods. Moreover, according to the disclosed methods, mixed-cation or mixed-metal exchanged aluminosilicates can be prepared. In a further aspect, the method provided by this disclosure is not limited to a particular oxidation state of the metal or a particular charge on a complex that comprises the metal.

In a further aspect, according to the methods disclosed herein, the following cations or metal-containing cations (e.g. molybdenyl cations, $[MoO_2]^{+2}$) can be exchanged into the aluminosilicate materials according to this disclosure. Examples of cations that can be ion exchanged according to this disclosure include, but are not limited to, cations of lithium, sodium, potassium, rubidium, cesium, beryllium, magnesium, calcium, strontium, barium, aluminum, gallium, indium, thallium, silicon, germanium, tin, lead, arsenic, antimony, bismuth, scandium, yttrium, titanium, zirconium, hafnium, vanadium, niobium, tantalum, chromium, molybdenum, tungsten, manganese, technetium, rhenium, iron, ruthenium, osmium, cobalt, rhodium, iridium, nickel, palladium, platinum, copper, zinc, cadmium, lanthanum, cerium, praseodymium, neodymium, promethium, samarium, europium, gadolinium, terbium, dysprosium, holmium, erbium, thulium, ytterbium, lutetium, thorium, uranium, and any combinations thereof. Examples of metal-containing cations that can be exchanged into the aluminosilicate materials according to this disclosure include, but are not limited to, molybdenyl ($[MoO_2]^{+2}$), vanadyl ($[VO]^{+2}$), chromyl ($[CrO_2]^{+2}$), oxyvanadium(IV) ($[VO_2]^+$), and the like.

In a further aspect, the source of the cation to be exchanged, also referred to as the "second" cation source, can comprises a compound of Ti, Zr, Hf, V, Nb, Ta, Cr, Mo, W, Mn, Tc, Re, Fe, Ru, Os, Co, Rh, Ir, Ni, Pd, Pt, Cu, Zn, Cd, Sc, Y, La, Er, Tb, Nd, Yb, Eu, Ce, Th, U, Li, K, Rb, Cs, Be, Mg, Ca, Sr, Ba, Al, Ga, In, Tl, Ge, Sn, Pb, or any combination thereof. Useful compounds can be neutral compounds, complex cations, or complex anions, or combinations of these. Alternatively, the "second" cation source, can comprises a compound of Ti, Zr, V, Nb, Cr, Mo, Mn, Fe, Ru, Co, Rh, Ir, Cu, Sc, Y, La, Ce, Th, U, Li, K, Mg, Ca, Sr, Al, Ga, In, Sn, or Pb; alternatively, a compound of Ti, Zr, V, Cr, Mo, Mn, Fe, Co, Rh, Ir, Li or Mg; alternatively, Ti, V, Mn, Li, or Mg; alternatively, Mn, Li, or Mg; alternatively, Mg; alternatively, Li; or alternatively, Mg.

According to another aspect, this disclosure encompasses a process for exchanging cations in an aluminosilicate, in which the cation source for the "second" cation to be exchanged with the "first" cation already associated with the aluminosilicate as a counter ion, can comprise a complex having the general formula $[ML_jX_x]^q$ wherein:
M is a transition metal, lanthanide metal, or actinide metal in the x+q oxidation state;

L, in each occurrence, is independently a neutral monodentate ligand;

l is an integer from 0 to 7, inclusive;

X, in each occurrence, is independently a monoanionic ligand;

x is an integer from 0 to 7, inclusive; and q is a charge from 0 to +4, inclusive.

In this general formula, $[ML_lX_x]^q$, M can be any of the transition metals, lanthanide metals, or actinide metals disclosed herein. For example, M can be Ti, Zr, V, Nb, Cr, Mo, Mn, Fe, Ru, Co, Rh, Ir, Cu, Ag, Au, Sc, Y, La, Li, K, Mg, Ca, Sr, Al, Ga, In, Sn, or Pb. Alternatively, M can be Ti, Zr, V, Nb, Cr, Mn, Fe, or Co; alternatively, M can be Ti or Mn; or alternatively, M can be Mn. Because q is a charge from 0 to +4, inclusive, many sources for the second cation are associated with a suitable anionic counter ion, examples of which are provided in F. A. Cotton et al., Advanced Inorganic Chemistry, 6$^{th}$ ed., J. Wiley & Sons, Inc., New York, 1999; and N. N. Greenwood & A. Earnshaw, Chemistry of the Elements, 2$^{nd}$ ed., Butterworth-Heinemann, 1997. Simple examples include, but are not limited to nitrate, sulfate, chloride, bromide, tetrafluoroborate, hexafluorophosphate, and the like.

In yet another aspect, in this general formula, the complex $[ML_lX_x]^q$ can comprise at least one X is selected from fluoride, chloride, bromide, iodide, hydroxide, $C_1$-$C_{10}$ hydrocarbyloxide, cyano, or cyanate. The complex $[ML_lX_x]^q$ also can comprise at least one L is selected from tetrahydrofuran (THF), furan, methyltetrahydrofuran, dihydrofuran, tetrahydropyran, 2,3-dihydropyran, 1,3-dioxane, 1,4-dioxane, morpholine, N-methylmorpholine, acetonitrile, propionitrile, butyronitrile, benzonitrile, dimethyl sulfoxide (DMSO), pyridine, ammine ($NH_3$), $NH_2Me$, $NH_2Et$, $NHMe_2$, $NHEt_2$, $NMe_3$, $NEt_3$, $PMe_3$, $PEt_3$, $PPh_3$, $P(n-Bu)_3$, $P(OMe)_3$, $P(OEt)_3$, $P(O-n-Bu)_3$, methyl isocyanide, n-butyl isocyanide, phenyl isocyanide, carbonyl, $SMe_2$, thiophene, or tetrahydrothiophene (THT).

In still a further aspect and in any embodiment, the second cation source can be selected from $TiCl_3$, $TiBr_3$, $ZrCl_3$, $ZrBr_3$, $HfCl_4$, $VCl_3$, $NbCl_4$, $NbCl_5$, $TaCl_5$, $CrF_3$, $CrCl_3$, $CrBr_3$, $MnCl_3$, $ReCl_3$, $ReCl_4$, $FeCl_3$, $FeBr_3$, $FeI_3$, $RuCl_3$, $RuCl_4$, $CoF_3$, $CoCl_3$, $TiCl_3(THF)_3$, $VCl_3(THF)_3$, $VCl_3(SMe_2)_2$, $CrCl_3(NMe_3)_2$, $CrCl_3(pyridine)_3$, $CrCl_3(THF)_3$, $MnI_3(PMe_3)_2$, and $FeCl_3(PEt_3)_2$.

A further aspect and in any embodiment, the second cation source can be selected from a compound of, or containing, a cation of lithium, sodium, potassium, rubidium, cesium, beryllium, magnesium, calcium, strontium, titanium, vanadium, chromium, manganese, iron, cobalt, nickel, copper and the like. For example, the second cation source can be a compound of $Li^+$, $K^+$, $Mg^{2+}$, $Ca^{2+}$, $Cr^{3+}$, $Mn^{2+}$, $Fe^{2+}$, $Co^{2+}$, $Ni^{2+}$, and the like; alternatively, the second cation source can be a compound of $Li^+$, $Mg^{2+}$, $Cr^{3+}$, $Mn^{2+}$, $Fe^{2+}$, or $Co^{2+}$; alternatively, the second cation source can be a compound of $Li^+$, $Mg^{2+}$, or $Mn^{2+}$; alternatively, $Li^+$; alternatively, $Mg^{2+}$; or alternatively, $Mn^{2+}$.

Typical Exchange Conditions

A further aspect and in any embodiment of this disclosure, a range of conditions can be used as exchange conditions to effect the cation exchange between the ion-exchangeable aluminosilicate and its counter ion, and the added "second" cation. In one aspect, the ion-exchangeable aluminosilicate and the second cation source can be combined in any molar ratios to effect exchange. In some aspects, a molar excess of second cation to first cation relative to a charge-balanced amount is desirable; however, this is not always possible when the solubility of the second cation source in the polyether solution is limited. Therefore, in one aspect, the ion-exchangeable aluminosilicate and the second cation source can be combined in an approximately equimolar ration up to the solubility limit of the second cation source. For example, in a further aspect, the ion-exchangeable aluminosilicate and the second cation source can be combined in an amount to provide a 0.1:1 to 500:1 molar ratio of second cation to first cation relative to a charge-balanced amount. Alternatively, the ion-exchangeable aluminosilicate and the second cation source can be combined in an amount to provide a 0.5:1 to 200:1 molar ratio, 1:1 to 100:1 molar ratio, 2:1 to 50:1 molar ratio, 3:1 to 20:1 molar ratio, or 5:1 to 10:1 molar ratio of second cation to first cation relative to a charge-balanced amount.

The temperature of the mixture can also constitute an exchange condition parameter. At lower temperatures, slow or little exchange may be observed, while at higher temperatures, solvent degradation may be observed or the solvent may boil, which may be undesirable for practical reasons. While the ion exchange process can occur at some rate at almost any temperature, ion exchange typically occurs at reasonable rates over a range of temperatures from about room temperature up to the boiling point of the polyether. For example and in any embodiment, suitable temperatures can be from about 40° C. up to the boiling point of the polyether; alternatively, from about 50° C. up to the boiling point of the polyether; or alternatively, from about 60° C. up to the boiling point of the polyether. Alternatively, and in any embodiment, suitable exchange temperatures can be from 50° C. to 400° C.; alternatively, from 60° C. to 300° C.; alternatively, from 70° C. to 200° C.; alternatively, from 80° C. to 175° C.; alternatively, from 90° C. to 150° C.; or alternatively, from 100° C. to 125° C.

Exchange Process and Characterization of Ion-Exchanged Aluminosilicates

Figure 2:
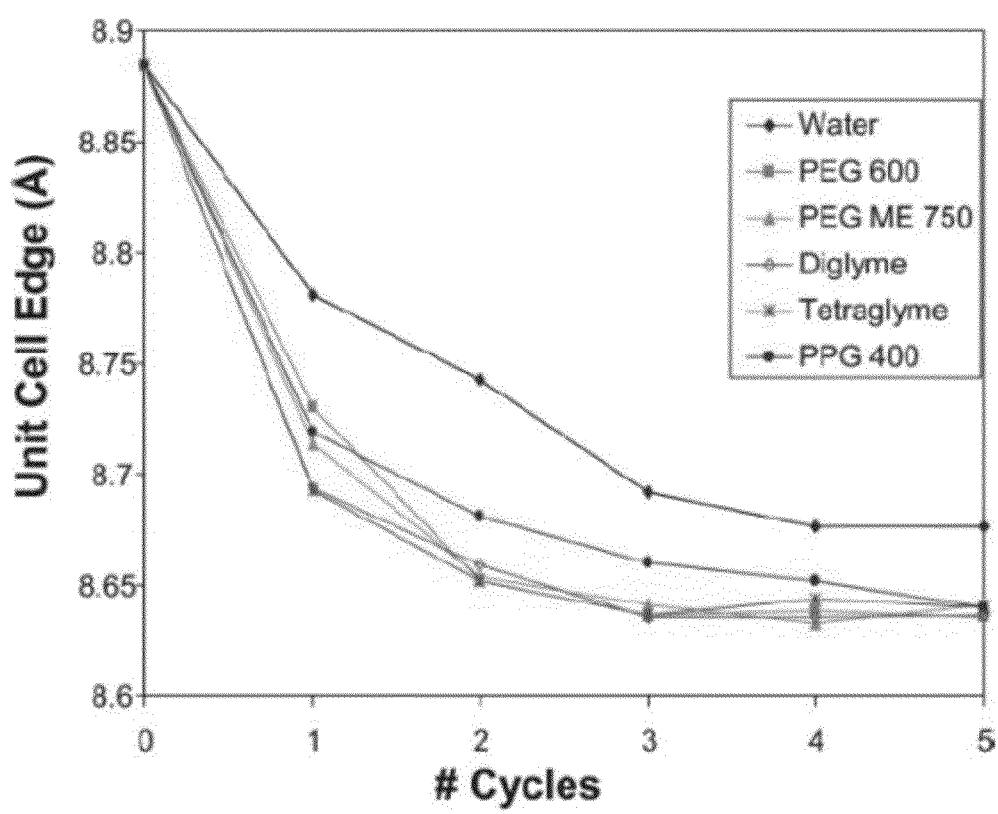
FIG. 2 illustrates unit cell data for sodium hydrosodalite exchanged with 1.0 M LiNO$_3$ in oligomer solvents after five exchange cycles.

Hydrosodalite exchange reactions were carried out using 1.0 M solutions of $LiNO_3$ in either deionized water as a control or in the various PEO oligomers. The size of the hydrosodalite unit cell was monitored after each of the five exchanges in each solvent as shown in FIG. 2. As sodium ions in the sodalite cages were exchanged for lithium ions, the framework bond angles changed to accommodate the smaller cations causing a decrease in the unit cell size. The unit cell of sodium hydrosodalite, $Na_6(AlSiO_4)_6 \cdot 8H_2O$, is 8.885 Å and the unit cell of the most highly exchanged lithium hydrosodalite (obtained from exchange carried out in PEO oligomer with average mw of 600 g mol$^{-1}$) was 8.635 Å. The unit cell data for the first two cycles of aqueous Li+ ion exchange with hydrosodalite (8.781(7) Å and 8.743(2) Å, respectively) agree well with data from other reports (8.7854(5) Å and 8.7675(3) Å, respectively; (See, E. Kendrick and S. Dann, J. Solid State Chem., 2004, 177, 1513-1519) using a slightly different exchange technique in which hydrosodalite was refluxed with aqueous 2.0 M $LiNO_3$ for 24 hours.

These data indicate that Li+ ion exchange was achieved using these PEO oligomer solutions, and that it was at least as efficient as traditional aqueous exchange. According to the unit cell parameters, approximately 60% exchange occurred in the first cycle followed by only small amounts of exchange during each subsequent cycle. In fact, very little change occurred after the fourth cycle even with the exchange temperature increased to 125° C. As the size of the unit cell decreased, it becomes increasingly difficult to induce more exchange.

In order to quantitatively determine the extent of lithium ion exchange that occurred, elemental analysis was conducted on these samples after the fifth exchange cycle.

TABLE 1 shows the data of the elemental analyses and the unit cell a value for sodium hydrosodalite exchanged with 1.0 M LiNO$_3$ in oligomer solvents after the fifth exchange cycle. These unit cell data are compared to the unexchanged sodium hydrosodalite Na$_6$(AlSiO$_4$)$_6$·8H$_2$O, which has a unit cell parameter a=8.885 Å. The compositions of each sodalite unit cell after exchange in their respective solvents are provided. The polymeric solvents used and reported in TABLE 1 are polyethylene glycol 600 [HO(CH$_2$CH$_2$O)$_n$H (n=13)], Poly (ethylene glycol methyl ether) 750 [HO(CH$_2$CH$_2$O)$_n$CH$_3$ (n=16)], diethylene glycol dimethyl ether (diglyme) [H$_3$CO(CH$_2$CH$_2$O)$_n$CH$_3$ (n=2)], tetraethylene glycol dimethyl ether (tetraglyme) [H$_3$CO(CH$_2$CH$_2$O)$_n$CH$_3$ (n=4)], or poly(propylene glycol) 400 [HO(CH$_2$CH(CH$_3$)O)$_n$H (n=7)].

These results confirm the diffraction data, indicating that ion exchange using oligomer solvents works as well or better when compared to traditional aqueous exchange. While water was only able to exchange 90% of the hydrosodalite sodium ions with lithium ions, the oligomer solvents were able to exchange between 92-99% of the sodium ions after five exchange cycles. Water content, determined by thermogravimetric analyses, ranged from 4.18 to 5.71 moles of water per unit cell. This is on average lower than the 8 moles of water per unit cell for sodium hydrosodalite. While not intending to be bound by theory, this observation is likely due to the decrease in unit cell size; the range observed may be due to variations in environmental conditions such as humidity. These variations in water content will affect the observed unit cell parameter, as evidenced by the different cell sizes seen for compounds with very similar Na/Li ratios in TABLE 1.

TABLE 1

Elemental composition and unit cell data for sodium hydrosodalite exchanged with 1.0M LiNO$_3$ in oligomer solvents after the fifth exchange cycle.[A]

| Solvent | Na$_{6-x}$Li$_x$(AlSiO$_4$)$_6$·nH$_2$O | Unit cell/Å |
|---|---|---|
| Water | Na$_{0.63}$Li$_{5.37}$(AlSiO$_4$)$_6$·4.89H$_2$O | 8.676(1) |
| PEG 600 | Na$_{0.04}$Li$_{5.96}$(AlSiO$_4$)$_6$·4.18H$_2$O | 8.635(2) |
| PEG ME 750 | Na$_{0.04}$Li$_{5.96}$(AlSiO$_4$)$_6$·5.71H$_2$O | 8.641(3) |
| Diglyme | Na$_{0.5}$Li$_{5.50}$(AlSiO$_4$)$_6$·5.30H$_2$O | 8.636(2) |
| Tetraglyme | Na$_{0.44}$Li$_{5.56}$(AlSiO$_4$)$_6$·4.99H$_2$O | 8.640(3) |
| PPG 400 | Na$_{0.38}$Li$_{5.62}$(AlSiO$_4$)$_6$·5.36H$_2$O | 8.640(2) |

[A]Unexchanged sodium hydrosodalite Na$_6$(AlSiO$_4$)$_6$·8H$_2$O has a unit cell parameter a = 8.885 Å.

While not intending to be bound by any theory of this process or method, it is believed that the effectiveness of an ion exchange solvent is likely due to a combination of kinetic and thermodynamic factors. Due to their large dipole moment, water molecules coordinate lithium ions strongly, generally hindering the movement of the lithium cations through the zeolite windows. Again, while not theory-bound, it is thought that the polyether oligomers do not coordinate the lithium ion as strongly as water molecules, as polarity is expected to decrease with increasing hydrocarbon character. Thus the polyether oligomers likely assist in mobilizing the ion through the less tightly bound coordination sphere. Thermodynamic factors, such as the possible stronger interaction between Li+ and the sodalite framework may also affect these exchange results.

It is observed from the TABLE 1 data that, even among the oligomers, results show the PEG solvents to be more effective than the methyl-capped glymes in allowing the exchange to proceed further. While not intending to be bound to any particular theory, this observation may result from weaker coordination by glyme solvent ether oxygen atoms, as compared to the PEG oligomers, which coordinate through both ether oxygen atoms and more polar terminal hydroxyl oxygen atoms.

Exchanges were also investigated in an anhydrous environment where water was substantially eliminated from within the sodalite cages, and the solvents and salts were rigorously dried, to determine whether water is required during ion exchange even in oligomer solvent systems. While it is not possible to absolutely preclude minute trace amounts of water, these tests were carried out using dehydrated sodalite, Na$_6$(AlSiO$_4$)$_6$ and provided the following results. Dehydrated sodalite ion exchanges were carried out in a glove box in 1.0 M LiNO$_3$ solutions in each oligomer, using dried LiNO$_3$ and dried solvents, and compared with the nitrate melt method using dehydrated sodalite and dried LiNO$_3$.

Figure 3:
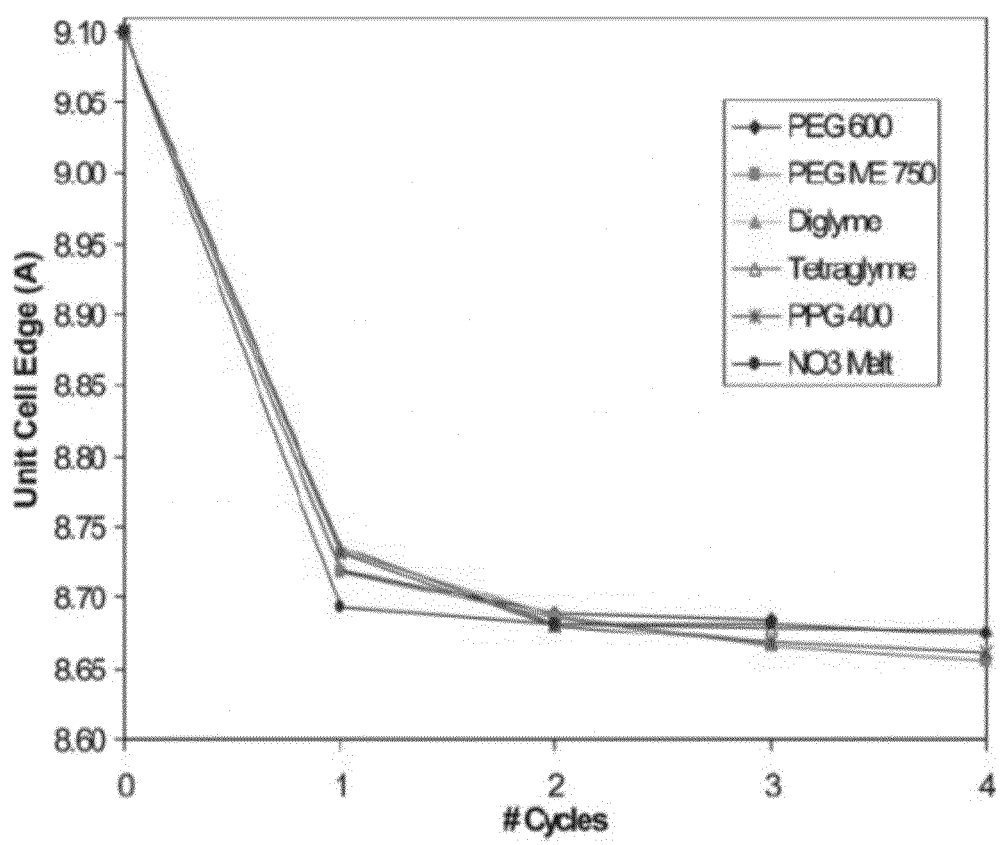
FIG. 3 illustrates unit cell data for sodium dehydrated sodalite exchanged with 1.0 M LiNO$_3$ in oligomer solvents after four exchange cycles.

These tests also revealed a decrease in unit cell size as expected following exchange of the smaller lithium ions. The unit cell of the starting compound, sodium dehydrated sodalite, Na$_6$(AlSiO$_4$)$_6$, is 9.11 Å. The larger size of the dehydrated sodalite (compared to the 8.885 Å cell edge of the hydrated Na$_6$(AlSiO$_4$)$_6$·8H$_2$O) is likely due to increased repulsions between Na+ cations, which are not shielded by water molecules. The size of the dehydrated sodalite unit cell was monitored after four exchange cycles for each oligomer solution and the nitrate melt as shown in FIG. 3. Data were not obtained for the PEG 600 and diglyme solvents after the fourth cycle, as the sodalite sample particle size had become so small and the sample was lost, precluding a fifth exchange cycle.

In contrast to the hydrated sodalite experiments, differences between oligomer ion exchange efficiencies were not particularly evident in these tests. Thus, the extent of ion exchange was approximately equivalent for each solvent over each exchange cycle. Approximately 75% exchange was observed after the first cycle with increasingly smaller amounts of exchange throughout the remaining test. Remarkably, the exchange efficiencies of the oligomers, with product unit cell parameters ranging from 8.685(5) Å to 8.656(3) Å after 3 to 4 cycles, were comparable to efficiencies of the much more thermally rigorous nitrate melt method, which yielded a unit cell parameter of 8.674(3) Å after 4 cycles. Accordingly, it the PEO oligomer solvents allowed for a similar amount or extent of exchange under anhydrous conditions, in a far more convenient manner compared to the molten salt exchange method.

Results from elemental analyses conducted on these dehydrated sodalite samples after the fourth cycle of exchange are shown in TABLE 2, along with the composition of each sodalite unit cell after exchange in their respective solvents. As noted previously, elemental analysis was not conducted on the dehydrated sodalite samples exchanged in PEG 600 and diglyme as they were lost during filtration of the fourth exchange cycle. However, elemental compositions on these compositions were approximated via Vegard's law based on unit cell data taken after the third exchange cycle are listed in TABLE 2. These results confirm the oligomer ion exchange efficiencies as indicated by the unit cell data. The polyether oligomer solvents were able to exchange between 88-91% of the dehydrated sodalite sodium ions after three to four cycles of exchange. Accordingly, the polyether oligomer solvents facilitated ion exchange in a dehydrated environment with efficiencies comparable to traditional aqueous and melt exchange methods.

TABLE 2

Elemental composition and unit cell data for sodium hydrosodalite exchanged with 1.0M LiNO$_3$ in oligomer solvents after the fifth exchange cycle.[A]

| Solvent | Na$_{6-x}$(Li$_x$(AlSiO$_4$)$_6$ | Unit cell/Å |
|---|---|---|
| PEG 600[A] | ~Na$_{0.70}$Li$_{5.30}$(AlSiO$_4$)$_6$ | 8.685(5) |
| PEG ME 750 | Na$_{0.62}$Li$_{5.38}$(AlSiO$_4$)$_6$ | 8.656(3) |
| Diglyme[A] | ~Na$_{0.64}$Li$_{5.36}$(AlSiO$_4$)$_6$ | 8.667(3) |
| Tetraglyme | Na$_{0.66}$Li$_{5.34}$(AlSiO$_4$)$_6$ | 8.677(3) |
| PPG 400 | Na$_{0.53}$Li$_{5.47}$(AlSiO$_4$)$_6$ | 8.661(3) |

[A]Data for PEG 600 and diglyme after three cycles with calculated compositions.

To summarize and in general terms, ion exchange using polyether solvents was effected and was efficient for hydrosodalite, with 99% ion exchange achieved. Ion exchange using polyether solvents was effected and was efficient for dehydrated sodalite as well, with 91% ion exchange achieved under anhydrous conditions. These results indicate that the presence of water was not required for ion exchange, as the oligomers alone can complex and transport the ion sufficiently. As these solvent molecules are too large to fit through the sodalite windows, the data also indicate that exchange solvents are not required to "chaperone" ions into zeolite cages for efficient exchange, contrary to previous views. Thus, this disclosure provides a medium for the exchange of transition metals, rare earth elements, actinide elements, alkali metals, and alkaline earth metals into zeolites and related aluminosilicates, which addresses some of the issues of aqueous ion exchange methods. Thus, ion exchange experiments using transition metals and rare earth metals into sodalite and other zeolites using these oligomer solvents have also been performed and show similarly favorable results. In addition to zeolite modification, the results indicate that these solvents can be utilized for non-aqueous ion exchange and doping of other inorganic solids as well.

This process is particularly useful in preparing ion-exchanged zeolites. In this aspect, a process is provided for exchanging cations in a zeolite, the process comprising:
   a. providing a zeolite comprising a first cation associated with the zeolite as a counter ion;
   b. providing a second cation source comprising a second cation different from the first cation;
   c. providing an exchange solvent selected from polyethylene oxide glycol, polypropylene oxide glycol, polyethylene oxide glycol methyl ether, polyethylene oxide glycol dimethyl ether, glyme, diglyme, or tetraglyme; and
   d. combining the ion-exchangeable zeolite and the second cation source in the exchange solvent under ion exchange conditions, to provide a mixture comprising the ion-exchanged zeolite comprising the second cation associated with the zeolite as a counter ion.

In this particular example of the disclosed method, the second cation source can be a compound of Li$^+$, Mg$^{2+}$, or Mn$^{2+}$; and the zeolite can be Zeolite X, Zeolite Y, Zeolite ZSM-5, Zeolite ZSM-4, or Zeolite Z, and the like.

DEFINITIONS

To define more clearly the terms used herein, the following definitions are provided. Unless otherwise indicated, the following definitions are applicable to this disclosure. If a term is used in this disclosure but is not specifically defined herein, the definition from the IUPAC Compendium of Chemical Terminology, 2$^{nd}$ Ed (1997) can be applied, as long as that definition does not conflict with any other disclosure or definition applied herein, or render indefinite or non-enabled any claim to which that definition is applied. To the extent that any definition or usage provided by any document incorporated herein by reference conflicts with the definition or usage provided herein, the definition or usage provided herein controls.

All periodic table group designations within the specification and claims are the group designations according to the IUPAC version of the periodic table which designates groups from 1 to 18, inclusive.

Regarding claim transitional terms or phrases, the transitional term "comprising", which is synonymous with "including," "containing," or "characterized by," is inclusive or open-ended and does not exclude additional, unrecited elements or method steps. However, when compositions and methods are described in terms of "comprising" various components or steps, the compositions and methods can also "consist essentially of" or "consist of" the various components or steps. Absent an indication to the contrary, when describing a compound or composition "consisting essentially of" is not to be construed as "comprising." Thus, "consisting essentially of" is intended to defined the scope of a claim to include the specified materials or steps and those that do not materially affect the basic and novel characteristic(s) of the claimed invention; therefore, it is intended to describe the recited component that includes materials which do not significantly alter composition or method to which the term is applied.

The terms "a," "an," and "the" are intended, unless specifically indicated otherwise, to include plural alternatives, that is, at least one. For instance, the disclosure of "a cation source" is meant to encompass one cation source, or mixtures or combinations of more than one cation source unless otherwise specified.

The term "polymer" and the prefix "poly" as used herein includes and describes long and short chain polymers, oligomers, or a mixture of oligomers containing the specified material or a specified monomer or repeating unit. This term is used interchangeably with "oligomer" or "oligomers." Accordingly, the term "polymer" can include single oligomers or a mixture of oligomers which can vary over any reasonable or specified range. For example, terms such as polyethylene oxide glycol and polypropylene oxide glycol refer to a wide range of "polymer" materials, which can be further modified or can be further limited according to a specified average molecular weight or molecular weight range, number of repeating units, commercial or industry standard designations, or the like.

The term "solvent" is used to describe the various polyalkylene oxide glycol compounds ("polyethers"), generally in the liquid state under the conditions at which cation exchange is effected, that are used as the exchange media in the disclosed process, regardless of the solubility of any recited component that may be combined with that "solvent" to form a mixture. For example, the aluminosilicate materials are generally insoluble in the polyethers that are employed; however, regardless of their lack of solubility the polyethers are referred to as "solvents." Many, though not all, of the second cation source compounds or complexes are soluble in the polyether exchange media, and the term "solvent" is used regardless.

The term "polyether" is intended to encompass the glycols, glycol monoethers, glycol diethers, or any higher multiple esters of a polyether. Therefore, polyalkylene oxide glycols, polyalkylene oxide glycol monoethers, polyalkylene oxide glycol diethers, and so forth, are all encompassed by the term "polyether" in this disclosure. For example, in one aspect, the exchange solvent can comprise a polyether having the formula R$^1$O[(CH$_2$)$_m$CHR$^2$O]$_n$R$^1$ in which R$^1$, independently, can be selected from H or an alkyl or hydrocarbyl group, generally having from 1 to about 12 carbon atoms. Thus, this general formula represents the "polyethers" to collectively encompass the glycols, the monoethers, and the diethers as useful "solvents."

Polyalkylene oxide glycols may also be termed "polyalkylene oxides" or "polyalkylene glycols," and these terms are used interchangeably to refer to substituted or unsubstituted, linear or branched, oligomers or polymers of an alkylene oxide. Thus, these terms are generic in that they include such polyalkylene oxides as polyethylene oxide, polypropylene oxide, and the like, as defined herein. Unless otherwise specified, the alkylene moiety typically has two carbon atoms in the polyalkylene oxide backbone, with one, two, or more additional carbons as side chains off that backbone. Thus, each repeating polyalkylene oxide unit can comprise 2, 3, 4, 5, 6, or more carbon atoms. In this aspect, the polyalkylene oxides are not limited to a two-carbon repeating backbone of the form —$CH_2CH_2O$—. Similarly, polyalkylene oxide glycol monoethers may also be termed "polyalkylene oxide monoethers" or "polyalkylene glycol monoethers," and these terms are used interchangeably. Further, polyalkylene oxide glycol diethers may also be termed "polyalkylene oxide diethers" or "polyalkylene glycol diethers," and these terms are used interchangeably.

The term "polyethylene glycol" (PEG) is synonymous with the terms "polyethylene oxide" (PEO), which refer to the polyalkylene oxide glycols that can be considered substituted or unsubstituted, linear or branched, oligomers or polymers of ethylene oxide. These terms are used interchangeably, regardless of molecular weight, chain length, viscosity, branching structures if any, and the like. Therefore, because these terms generally encompass the substituted oligomers or polymers of ethylene oxide, if the context allows, terms such as "polyethylene glycol" (PEG) and "polyethylene oxide" (PEO) may encompass polypropylene glycol. Moreover, if the context allows, terms such as "polyethylene glycol" (PEG) and "polyethylene oxide" (PEO) may encompass the monoethers of these compounds as well. These substances may be referred to as "oligomers" throughout. Moreover and unless specified otherwise, PEGs with different geometries such as branched PEGs, star PEGs having multiple PEG chains emanating from a central core group, and comb PEGs in which multiple PEG chains are normally grafted to a polymer backbone are encompassed in these terms. One of ordinary skill in the art will understand that when numbers are included in the name of a particular PEG, these numbers typically refer to an approximate molecular weight or an average molecular weight for that PEG material. For example, a PEG having the formula HO[$CH_2CH_2O$]$_n$H, in which the average value of n is about 9, would have an average molecular weight of approximately 400 Daltons and hence would be designated PEG 400. Most PEGs are characterized by a distribution of molecular weights and therefore have a certain associated polydispersity.

In one aspect, the term "glyme" is used to refer to the class polyalkylene oxide glycol diether of compounds, which includes diethers of any polyalkylene glycol such as polyethylene glycol. Thus, this term can be used in its generic form to encompass the diether form of any of the polyalkylene oxides disclosed here, regardless of their molecular weight, chain length, branching, substitution, and the like. This term also includes diethers of glycols that contain more that a single type of repeating unit in the backbone, such as for example $H_3CO[CH_2CH_2O]$—$[CH_2CH_2CH_2O][CH_2CH_2O]CH_3$, and the like.

The term "hydrocarbyl group" is used herein in accordance with the definition specified by IUPAC to refer to a univalent group formed by removing a hydrogen atom from a hydrocarbon, that is, a group containing only carbon and hydrogen. By way of example, non-limiting examples of hydrocarbyl groups include aryl, alkyl, cycloalkyl, and aralkyl, among other groups as members. Thus, specific non-limiting examples of hydrocarbyl groups include methyl, ethyl, propyl, butyl, hexyl, phenyl, tolyl, xylyl, mesityl, propenyl, and the like. A "hydrocarbyl group" can be acyclic or cyclic group and/or may be linear or branched. Unless specified otherwise, all possible stereoisomers, enantiomers, and diastereomers are encompassed in the recitation of a particular hydrocarbyl group or hydrocarbyl groups. A "hydrocarbyl group" can include rings, ring systems, aromatic rings, and aromatic ring systems, which contain only carbon and hydrogen.

The term "alkyl group" is used herein in accordance with the definition specified by IUPAC: a univalent group formed by removing a hydrogen atom from an alkane. An "alkyl group" can be acyclic or cyclic groups, and/or may be linear or branched unless otherwise specified. A primary, secondary, and tertiary alkyl group are derived by removal of a hydrogen atom from a primary, secondary, tertiary carbon atom, respectively, of an alkane. The n-alkyl group derived by removal of a hydrogen atom from a terminal carbon atom of a linear alkane. The groups $RCH_2$ (R≠H), $R_2CH$(R≠H), and $R_3C$ (R≠H) are primary, secondary, and tertiary alkyl groups, respectively. Similarly, an "alkylene group" refers to a group formed by removing two hydrogen atoms from an alkane, generally one hydrogen atom from two different carbon atoms, as used herein.

When reagents are indicated as "anhydrous," such as the anhydrous metal salts used for ion exchanges, these reagents either were purchased in anhydrous form and used as received, or were dried using standard laboratory procedures for drying. For example, zeolites were heated to 400° C. under high vacuum to dry, and PEG solvents were dried over 4 Å molecular sieves under a flow of nitrogen gas. All the subsequent reactions were carried out in a dry box with an argon atmosphere.

The symbols "~" and "≈" mean "about."

All publications and patents mentioned in this disclosure are incorporated herein by reference in their entireties, for the purpose of describing and disclosing the constructs and methodologies described in those publications, which might be used in connection with the methods of this disclosure. Any publications and patents discussed above and throughout the text are provided solely for their disclosure prior to the filing date of the present application. Nothing herein is to be construed as an admission that the inventors are not entitled to antedate such disclosure by virtue of prior invention.

Unless indicated otherwise, when a range of any type is disclosed or claimed, for example a range of the number of carbon atoms, molar ratios, temperatures, and the like, it is intended to disclose or claim individually each possible number that such a range could reasonably encompass, including any sub-ranges encompassed therein. For example, when describing a range of the number of carbon atoms, each possible individual integral number and ranges between integral numbers of atoms that the range includes are encompassed therein. Thus, by disclosing a $C_1$ to $C_{10}$ alkyl group or an alkyl group having from 1 to 10 carbon atoms or "up to" 10 carbon atoms, Applicants' intent is to recite that the alkyl group can have 1, 2, 3, 4, 5, 6, 7, 8, 9, or 10 carbon atoms, and these methods of describing such a group are interchangeable. When describing a range of measurements such as temperatures, every possible number that such a range could reasonably encompass can, for example, refer to values within the range with one significant digit more than is present in the end points of a range. For example, a temperature between 90° C. and 100° C. includes individually temperatures of 90° C., 91° C., 92° C., 93° C., 94° C., 95° C., 96° C., 97° C., 98° C., 99° C., and 100° C. Applicants' intent is that these two methods of describing the range are interchangeable. Moreover, when a range of values is disclosed or claimed, which Applicants intent is to reflect individually each possible number that such a range could reasonably encompass, Applicants also intend for the disclosure of a range to reflect, and be interchangeable with, disclosing any and all sub-ranges and combinations of sub-ranges encompassed therein. In this aspect, Applicants' disclosure of a $C_1$ to $C_{10}$ alkyl group is intended to literally encompass a $C_1$ to $C_6$ alkyl, a $C_4$ to $C_8$ alkyl, a $C_2$ to $C_7$ alkyl, a combination of a $C_1$ to $C_3$ and a $C_5$ to $C_7$ alkyl, and so forth. Accordingly, Applicants reserve the right to proviso out or exclude any individual members of any such group or range, including any sub-ranges or combinations of sub-ranges within the group, if for any reason Applicants choose to claim less than the full measure of the disclosure, for example, to account for a reference of which Applicants are unaware at the time of the filing of the application.

In any application before the United States Patent and Trademark Office, the Abstract of this application is provided for the purpose of satisfying the requirements of 37 C.F.R. §1.72 and the purpose stated in 37 C.F.R. §1.72(b) "to enable the United States Patent and Trademark Office and the public generally to determine quickly from a cursory inspection the nature and gist of the technical disclosure." Therefore, the Abstract of this application is not intended to be used to construe the scope of the claims or to limit the scope of the subject matter that is disclosed herein. Moreover, any headings that may be employed herein are also not intended to be used to construe the scope of the claims or to limit the scope of the subject matter that is disclosed herein. Any use of the past tense to describe an example otherwise indicated as constructive or prophetic is not intended to reflect that the constructive or prophetic example has actually been carried out.

For any particular compound disclosed herein, the general structure presented is also intended to encompasses all conformational isomers and stereoisomers that may arise from a particular set of substituents, unless indicated otherwise. Thus, the general structure encompasses all enantiomers, diastereomers, and other optical isomers whether in enantiomeric or racemic forms, as well as mixtures of stereoisomers, as the context permits or requires. For any particular formula that is presented, any general formula presented also encompasses all conformational isomers, regioisomers, and stereoisomers that may arise from a particular set of substituents.

The present disclosure is further illustrated by the following examples, which are not to be construed in any way as imposing limitations upon the scope thereof. On the contrary, it is to be clearly understood that resort may be had to various other aspects, embodiments, modifications, and equivalents thereof which, after reading the description herein, may suggest themselves to one of ordinary skill in the art without departing from the spirit of the present invention or the scope of the appended claims.

Starting Materials and General Experimental Procedures

Unless otherwise specified, reagents were obtained from commercial sources and used as received. The following polymers, solvents, and reaction media were obtained from the designated sources: polyethylene glycol 600 (Acros Organics, $HO[CH_2CH_2O]_nH$, n~12-14), polyethylene glycol methyl ether 750 (Acros Organics, $HO[CH_2CH_2O]_nCH_3$, n~15-17), diglyme (Acros Organics, $H_3CO[CH_2CH_2O]_2CH_3$, 99%), tetraglyme (Alfa Aesar, $H_3CO[CH_2CH_2O]_4CH_3$, 98+%), and polypropylene glycol 400 (Alfa Aesar, $HO[CH_2CH(CH_3)O]_nH$, n~6-7).

For reactions carried out under dry or anhydrous conditions, polyether solvents were dried over 4 Å molecular sieves under a flowing nitrogen atmosphere overnight (approximately 16 hours). No further purification or drying was carried out. For exchange reactions carried out under rigorously dehydrated conditions, all the reagents were dried and stored into a dry box prior to reaction, as in Examples 4, 7, and 9. For other reactions, and unless otherwise specified, rigorous drying steps for the reagents were not employed; therefore, these exchange reactions were carried out with some water present in the zeolites and the solvents. For example, no drying of reagents was employed in Examples 3, 6, or 8.

X-Ray Powder Diffraction

All samples for X-ray powder diffraction were mixed with a silicon internal standard (Strem Chemicals, 99+%). Dehydrated sodalite samples were prepared inside a glove box and placed in an air-tight sample holder sealed with Kapton film. The powder patterns of these exchanged sodalite samples were obtained on a Rigaku Ultima III powder X-ray diffractometer and compared to the powder patterns for sodium hydrosodalite/dehydrated sodalite. The size of the exchanged sodalite unit cell was refined using the accompanying MDI Jade software package.

Inductively Coupled Plasma-Mass Spectrometry (ICP-MS)

The sodalite Li, Na, Al, and Si concentrations were determined quantitatively with a FinniganMat ELEMENT 1 high resolution inductively coupled plasma mass spectrometer (HRICP-MS) at the Isotope Geochemistry Division, National High Magnetic Field Laboratory, at Florida State University. This instrument is equipped with a CD-1 guard electrode for enhanced sensitivity (1-1.6 $e^6$ cps $^{115}$In for 1 ppb In solution). Sample introduction was performed with a 100 µL min$^{-1}$ self-aspirating TEFLON nebulizer (Elemental Scientific) and a TEFLON spray chamber. Solutions of the exchanged sodalite samples were prepared by completely dissolving the material in nitric acid and then diluting with deionized water to approximately 10 ppm Al in 2% $HNO_3$. A standard solution was prepared so that it closely matched the concentration and approximate stoichiometry of the analyzed sodalite samples. Standard solution compositions were as follows: 10 ppm Al (Alfa Aesar, 1000 µg mL$^{-1}$), 10 ppm Si (Alfa Aesar, 1000 µg mL$^{-1}$), 5 ppm Na (Alfa Aesar, 1000 µg mL$^{-1}$), and 5 ppm Li (SCP Science, 1000 µg mL$^{-1}$) in 2% $HNO_3$. The isotopes $^7$Li, $^{23}$Na, $^{27}$Al and $^{29}$Si were measured in medium resolution mode (m/Δm=4000) in order to eliminate isobaric interferences, which provided accurate Li—Na exchange determination, as $^7$Li$^{16}$O interferes with $^{23}$Na, $^{14}$N$^{2+}$ interferes with $^7$Li$^+$, and $^{13}$C$^{16}$O and $^{12}$C$^{16}$O$^1$H interfere with $^{29}$Si. The maximum standard deviation for these measurements was 5%. Sample concentrations were determined by the standard-sample bracketing method, and from that the actual number of lithium moles per unit cell for each sodalite sample was determined.

Thermogravimetric Analysis

Samples of hydrosodalite after the fifth Li$^+$ ion exchange cycle were heated in a 170° C. oven overnight in order to remove surface moisture. These samples were then placed into alumina crucibles for analysis on an SDT 2960 Simultaneous DSCTGA and were heated to 800° C. at a rate of 10° C. min$^{-1}$ under a flow of oxygen gas at 100 mL/min. Sample weight loss below 400° C. was due to the loss of water molecules within the sodalite cages. No further weight loss was observed for the samples during the analysis. Percent weight loss was determined for each sample using the accompanying TA Universal Analysis 2000 software package. Using this information along with each sample's previously determined lithium content, the number of moles of water per exchanged hydrosodalite unit cell was determined for each sample.

Example 1

Hydrosodalite ($Na_6(AlSiO_4)_6 \cdot 8H_2O$) Synthesis

The starting material for the preparation of hydrosodalite ($Na_6(AlSiO_4)_6 \cdot 8H_2O$) was hydroxysodalite, $Na_8(AlSiO_4)_6(OH)_2 \cdot 2H_2O$, which was prepared hydrothermally from a basic solution of aluminum isopropoxide and tetraethyl orthosilicate, as follows. A 10.21 g (0.050 mol) amount of aluminum isopropoxide (Acros Organics, 98+%) and 40.0 g (1.0 mol) of NaOH (Fisher Chemicals, 99.8%) were added to a 125 mL PARR™ bomb Teflon liner, along with a magnetic stir bar. Deionized water (50 mL) was added and the mixture was stirred until the starting materials were completely dissolved and a clear solution was obtained, about 1 hour. A 10.53 g (0.0505 mol) amount of tetraethyl orthosilicate (Acros Organics, 98%) was then added to this mixture while stirring, after which water was added until the level of the mixture was about one inch from the top of the liner. The liner was covered and placed within the steel jacket, and the reaction mixture was heated at 170° C. for 7 days. The resulting product was filtered off, and excess NaOH was then removed from the cage of the hydroxysodalite, by aqueous Soxhlet extraction for 3 days, to produce hydrosodalite, $Na_6(AlSiO_4)_6 \cdot 8H_2O$. This compound was used for part of the ion exchange experiments described herein.

Example 2

Dehydrated Sodalite ($Na_6(AlSiO_4)_6$) Synthesis

The starting material for the preparation of dehydrated sodalite ($Na_6(AlSiO_4)_6$) was hydrosodalite ($Na_6(AlSiO_4)_6 \cdot 8H_2O$), prepared according to Example 1. Hydrosodalite ($Na_6(AlSiO_4)_6 \cdot 8H_2O$) was dried by heating the sample at 400° C. for 3 hours under a vacuum of $10^{-5}$ Torr, to substantially remove the water from the cage structure, to provide $Na_6(AlSiO_4)_6$. The anhydrous ion exchange experiments used dehydrated sodalite, $Na_6(AlSiO_4)_6$, prepared in this manner.

Example 3

Hydrosodalite Ion Exchange Reactions

Exchange reactions of hydrosodalite were carried out by adding 1.72 g (0.025 mol) of $LiNO_3$ (Fisher Chemicals, 99%) to 25.0 mL of either deionized water, polyethylene glycol 600 ($HO[CH_2CH_2O]_nH$, n~12-14), polyethylene glycol methyl ether 750 ($HO[CH_2CH_2O]_nCH_3$, n~15-17), diglyme ($H_3CO[CH_2CH_2O]_2CH_3$), tetraglyme ($H_3CO[CH_2CH_2O]_4CH_3$), or polypropylene glycol 400 (Alfa Aesar, $HO[CH_2CH(CH_3)O]_nH$, n~6-7). A 0.125 g amount of hydrosodalite was added to each of these solutions which was then heated in sealed polypropylene bottles in an oven at 100° C. overnight (about 16 hours). The resulting sodalite was filtered off, washed with deionized water, rinsed with acetone, and collected for analysis using X-ray powder diffraction. This process was repeated in order to observe changes in the sodalite unit cell parameters after multiple cycles of exchange, for example after five cycles of exchange. The temperature was increased to 125° C. for the fifth cycle of exchange in the oligomers tested.

Example 4

Dehydrated Sodalite Ion Exchange Reactions

Anhydrous ion exchange reactions were carried out using dehydrated sodalite in a glove box where the lithium nitrate used was dried at 225° C. overnight under a vacuum of $10^{-3}$ Torr, and all solvents used were dried over molecular sieves as indicated supra. A 1.03 g (0.015 mol) amount of $LiNO_3$ was added to 15.0 mL of either polyethylene glycol 600, polyethylene glycol methyl ether 750, diglyme, tetraglyme, or polypropylene glycol 400. A 0.100 g (0.117 mmol) amount of dehydrated sodalite was added to each of these solutions along with a magnetic stir bar. These mixtures were then set in an aluminum block on a hotplate in the glove box and heated at 100° C. overnight. The sodalite was filtered off in the glove box, rinsed with anhydrous monoglyme (Fisher Chemicals, 99.9%) and tetrahydrofuran (Acros Organics, 99.9%), collected, and prepared for powder XRD analysis in an air-tight sample holder. This process was repeated for four cycles of exchange; the temperature for the final cycle was increased to 125° C.

Example 5

Comparative Melt Method

Dehydrated Sodalite Ion Exchange Reactions

Dehydrated sodalite exchanges were also conducted using the melt method, as follows. In the glove box, a 0.500 g (0.585 mmol) sample of dehydrated sodalite was ground together with an excess of dried $LiNO_3$ (5× volume) and then added into a quartz Schlenk tube and sealed. Outside the glove box, the mixture was heated at 360° C. overnight under a vacuum of $10^{-3}$ Torr. (The melting point of $LiNO_3$ is 254° C.; decomposes above 500° C.) The resulting sodalite was filtered off outside the glove box, washed with deionized water, rinsed with acetone, collected, and dried at 400° C. for 3 hours under a vacuum of $10^{-5}$ Torr. The dried samples were returned to the glove box, and the dehydrated sodalite was prepared for powder XRD analysis in an air-tight sample holder. As described in the polymer method, this process was repeated for four cycles of exchange.

Example 6

Hydrosodalite and Zeolite X Ion Exchange Reaction with Manganese (0.10 M $MnCl_2$)

Na hydrosodalite ($Na_6(AlSiO_4)_6 \cdot 8H_2O$, α=8.885 Å) begins to break down after one aqueous exchange cycle with Mn. Using the general exchange method described in Example 3, manganese-exchanged hydrosodalite can be prepared using 0.10 M $MnCl_2$, that does not exhibit the extensive degradation observed in aqueous exchange. As for exchange in the oligomer solvents, the structure is maintained, but split X-ray peaks indicate formation of products with a larger cell and a smaller cell, TABLE 3. The small unit cell is typical for a hydrated transition metal-exchanged sodalite. While not theory-bound, it is possible that the larger cell may be due to $Mn^{2+}$—$Mn^{2+}$ ion repulsions within the cages.

TABLE 3

Unit cell data for sodium hydrosodalite exchanged with 0.10M
$MnCl_2$ in oligomer solvents after one exchange cycle.

| Solvent | Sodalite unit cell (Å) |
| --- | --- |
| Water | can not refine |
| PEG 600 | 8.964(3)/8.662(2) |
| PEGME 750 | 8.849(2)/8.651(2) |
| Diglyme | 8.940(2)/8.641(4) |
| Tetraglyme | 8.918(3)/8.646(2) |
| PPG 400 | 8.974(2)/8.647(2) |

With hydrated Zeolite X exchange, the framework remains intact during exchange in water due to its higher Si/Al ratio. A slight decrease in the unit cell from 24.90994 Å is noted.

TABLE 4

Unit cell data for Zeolite X exchanged with 0.10M
$MnCl_2$ in oligomer solvents after one exchange cycle.

| Solvent | Zeolite X unit cell (Å) |
| --- | --- |
| Water | 24.76841(4) |
| PEG 600 | 24.895(4) |
| PEGME 750 | 24.878(3) |
| Diglyme | 24.90033(8) |
| Tetraglyme | 24.905(4) |
| PPG 400 | 24.92967(4) |

Example 7

Dehydrated Sodalite Ion Exchange Reaction with Manganese (0.10 M $MnCl_2$)

According to the general exchange method described in Example 4, manganese-exchanged dehydrated sodalite was prepared using 0.10 M $MnCl_2$. Thus, dehydrated sodalite ($Na_6[AlSiO_4]_6$, a=9.1 Å) as provided in this disclosure, along with the substantially anhydrous salts in oligomer solvents (dried according to standard laboratory procedures) provided manganese exchanged sodalite in which degradation of the structure was prevented during ion exchange. After three exchange cycles with manganese ($MnCl_2$), the expected decrease in the unit cell parameter was evident, TABLE 5. The elemental analysis in TABLE 5 indicates a maximum of 34% Mn ion exchange with this method.

TABLE 5

Elemental composition and unit cell data for sodium
hydrosodalite exchanged with 0.10M $MnCl_2$ in oligomer
solvents after the third exchange cycle.

| Solvent | $Na_{6-x}Mn_x(AlSiO_4)_6$ | Unit Cell Edge (Å) |
| --- | --- | --- |
| PEG 600 (3) | $Na_{3.95}Mn_{1.02}(AlSiO_4)_6$ | 8.880(2) |
| PEG ME 750 (3) | $Na_{4.16}Mn_{0.92}(AlSiO_4)_6$ | 8.901(2) |
| Diglyme (3) | $Na_{5.34}Mn_{0.33}(AlSiO_4)_6$ | 8.873(3) |
| Tetraglyme (3) | $Na_{4.57}Mn_{0.71}(AlSiO_4)_6$ | 8.867(2) |

Example 8

Hydrosodalite Ion Exchange Reaction with Iron (0.25 M $FeCl_2$)

Using the general procedure outlined in Example 3, after only one Na hydrosodalite exchange with $FeCl_2$, the acidic environment destroyed the structure in all solvents. With hydrated Zeolite X exchange, only water and PPG solutions destroyed the structure, while the other oligomer solutions were able to induce ion exchange and maintain the structure as observed in their powder XRD patterns. The XRD powder patterns of Zeolite X exchanged in water and PPG400 solutions of $FeCl_2$ revealed only the Si peaks, indicating the zeolite had been destroyed. Ion exchange in PEG solutions and glymes showed some broadening in their XRD powder patterns, but the structure was maintained.

Example 9

Dehydrated Sodalite Ion Exchange Reaction with Iron (0.25 M $FeCl_2$)

Using the procedure according to Example 4, after three Na dehydrated sodalite exchange cycles with $FeCl_2$, the expected decrease in the unit cell is once again noted, TABLE 6. The elemental analysis indicated that Fe exchanged into the structure. The elemental composition and unit cell data are provided in TABLE 6.

TABLE 6

Elemental composition and unit cell data for dehydrated
sodalite exchanged with 0.25M $FeCl_2$ in oligomer
solvents after the third exchange cycle.

| Solvent | $Na_{6-2x}Fe_x(AlSiO_4)_6$ | Unit Cell Edge (Å) |
| --- | --- | --- |
| PEG 600 (3) | $Na_{2.62}Fe_{0.88}(AlSiO_4)_6$ | 8.926(2) |
| PEG ME 750 (3) | $Na_{2.36}Fe_{0.72}(AlSiO_4)_6$ | 8.904(2) |
| Diglyme (3) | — | 8.908(2) |
| Tetraglyme (3) | $Na_{3.03}Fe_{0.99}(AlSiO_4)_6$ | 8.948(2) |
| PPG 400 (2) | — | 8.882(1) |

Example 10

Zeolite and Clay Ion Exchange Reaction with Transition Metal Ions, Lanthanides, and Actinides Constructive Example Exchange reactions of any number of zeolites and clays with various transition metal, lanthanide, or actinide ions can be carried out by combining complexes or salts of the selected metals and the subject zeolite or claim in a polyalkylene oxide glycol or ethers thereof, according to the procedures employed in Examples 3 or 4. Examples of suitable transition metal compounds that can be used according to this Example are provided in the specification. Suitable polymers/oligomers that can be used in this Example include, but are not limited to, polyethylene glycol 600 ($HO[CH_2CH_2O]_nH$, n~12-14), polyethylene glycol methyl ether 750 ($HO[CH_2CH_2O]_nCH_3$, n~15-17), diglyme ($H_3CO[CH_2CH_2O]_2CH_3$), tetraglyme ($H_3CO[CH_2CH_2O]_4CH_3$), or polypropylene glycol 400 ($HO[CH_2CH(CH_3)O]_nH$, n~6-7). The resulting exchanged solid can be filtered off, washed with deionized water, rinsed with acetone, and collected for analysis using X-ray powder diffraction.

Example 11

Preparation of Hydrated Zeolite X and Dehydrated Zeolite X

Hydrated Zeolite X, $Na_{80}Al_{80}Si_{112}O_{384} \cdot 212H_2O$ (Hyd Na—X), was synthesized from a basic solution of sodium aluminate and sodium silicate, according to the procedure outlined in Lechert, H.; Kacirek, H. *Zeolites*, 1991, 11, 720-728. A solution of 4.51 g (0.055 mol Na, 0.055 mol Al) NaAlO$_2$ (Strem Chemicals) and 38.0 g (0.95 mol) NaOH (Fisher Chemicals, 99.8%) in 250 mL DI H$_2$O was prepared and added to a solution of 61.2 g (0.214 mol Na, 0.275 mol Si) sodium silicate (Sigma-Aldrich, 14% NaOH, 27% SiO$_2$) in 250 mL DI H$_2$O in a polyethylene bottle with stirring. An amorphous gel mixture formed immediately. This mixture was stirred at room temperature for 7 hours and was then heated to 88° C. overnight. The precipitated product was filtered off and washed with DI H$_2$O, rinsed with acetone, and dried. Dehydrated Zeolite X, Na$_{80}$Al$_{80}$Si$_{112}$O$_{384}$ (Dehyd Na—X), was produced by heating the sample to 400° C. under a vacuum of 10$^{-3}$ Torr overnight and then under a vacuum of 10$^{-5}$ Torr for 5 hours. The resulting zeolite was stored in the dry box for subsequent experiments.

Example 12

Hydrated Zeolite X Ion Exchange Reactions

Hydrated zeolite exchange reactions were carried out by adding the hydrated zeolite to a solution of the transition metal chloride, (0.10 M anhydrous MnCl$_2$ (Alfa Aesar, 97%), 0.25 M FeCl$_2$.4H$_2$O (Fisher Scientific), or 0.10 M anhydrous CoCl$_2$ (Alfa Aesar 99.7%)), in either deionized water, polyethylene glycol 600 (PEG 600, Acros Organics, HO[CH$_2$CH$_2$O]$_n$H, n≈12-14), or polyethylene glycol methyl ether 750 (PEGME 750, Acros Organics, HO[CH$_2$CH$_2$O]$_n$CH$_3$, n≈15-17), in a >1 g/100 mL ratio. These solutions were then heated in sealed polypropylene bottles at 100° C. overnight. The samples were filtered off, washed with deionized water, and rinsed with acetone. This process was repeated in order to observe changes in the zeolite unit cell parameters after 2 cycles of exchange.

The exchange reactions to prepare hydrated sodium Zeolite X/transition metal exchanged materials, abbreviated Hyd Na/TM-X, where TM is the specific transition metal, were observed to change in color from off-white, light brown, and purple/blue (turning pink over time with hydration) after Mn, Fe, and Co exchange, respectively. The Hyd Na/Co—X exchanged samples remained intact through two cycles in PEG solutions with 48% Co$^{2+}$ ion exchange, according to elemental analysis results. The Hyd Na/Mn—X oligomer exchanged samples remained intact at the end of the first cycle with 80% Mn$^{2+}$ ion exchange; however, they began to decompose slightly during the second cycle as indicated by the lowered Si:Al ratio of 1.30. According to the elemental analysis of the Hyd Na/Fe—X oligomer exchanged samples, the PEG 600 exchanged sample remained intact with 91% exchange after one cycle before collapse in the second cycle. In contrast to this, the PEGME 750 exchanged sample began to collapse during the first cycle, resulting in a Si:Al ratio of 0.66. However, enough of the structure remained undamaged to produce an intact powder XRD pattern.

Example 13

Anhydrous Zeolite X Ion Exchange Reactions

Anhydrous ion exchange reactions were carried out using the dehydrated zeolites in a glove box with the previous anhydrous metal salts, anhydrous FeCl$_2$ (Alfa Aesar, 99.5%), and oligomer solvents purged with N$_2$ and dried over molecular sieves. These reactions followed the same method as above except they were sealed in glass vials with stir bars and then set in an aluminum block on a hotplate in the glove box and heated/stirred at 100° C. overnight. These samples were filtered in the glove box, rinsed with anhydrous ethylene glycol and anhydrous tetrahydrofuran (Sigma-Aldrich, 99.9%). This process was repeated for 2 cycles of exchange. After exchange, each of these samples retained the off-white color of the original dehydrated zeolite powder. Each sample's structure was preserved through two exchange cycles. The extent of ion exchange was relatively low; elemental analysis by ICP-MS indicated a maximum of 5.6%, 5.4%, and 6.0% ion exchange for the Mn, Fe, and Co samples, respectively.

Example 14

Catalytic NO Decomposition Using Manganese Exchanged Zeolite X

Catalytic activity of the samples was measured using a fixed-bed flow reactor. The transition metal exchanged hydrated Zeolite X (Hyd Na/TM-X) and dehydrated Zeolite X (Dehyd Na/TM-X) were examined for their activity for catalytic decomposition of NO to N$_2$. For each set of transition metal reactions, one sample from each type of exchange was measured for comparison. For example, in the manganese reactions, one sample from the Hyd Na/Mn—X aqueous, Hyd Na/Mn—X oligomer, and Dehy Na/Mn—X oligomer exchanges were measured. Approximately 0.053 g of dried, ground samples were placed into the reaction tube, calcined under an oxygen flow at 450° C. for approximately 3 hours, and subsequently placed under a helium flow as the system cooled to 200° C. overnight. Reactant gas, 4% NO in helium, (Air Gas South) was flowed through the zeolite bed at a rate of 10 mL/min. Three to five experimental runs were taken for each temperature from 200° C. to 450° C. at 50° C. intervals for each sample. Catalytic activity was measured for each sample by monitoring the area of the N$_2$ product peak formed from NO decomposition using an HP 5890 Series II gas chromatograph. The number of N$_2$ molecules formed was determined from a calibration curve using 0.50%, 1.0%, and 2.0% N$_2$ in helium balance standard gas mixtures (Air Gas South).

From this information, turnover frequency (TOF, the number of molecules of a given product formed per the number of active catalytic sites per second) was calculated for each sample over the given temperature range, in order to compare normalized data with respect to different experimental conditions and amount of exchange. It was observed that the dehydrated samples, with the smallest amount of transition metal sites, retained TOFs an order of magnitude greater than the hydrated samples. The TOF values of 0.0237, 0.0213, and 0.0190 s$^{-1}$ (for Dehyd Mn, Fe, and Co exchanged samples, respectively) are within the range for most heterogeneous NO decomposition reactions. See: Thomas, J. M.; Thomas, W. J. *Principles and Practice of Heterogeneous Catalysis*; VCH Publishers, Inc.: Weinheim, 1997. In addition, the observed TOF values show an improvement over those provided in the literature. See: Moretti, G. *Catal. Lett.* 1994, 28, 143-152. Many zeolites in previous studies are reported as having an excess of 100% transition metal exchange from aqueous solution; therefore, it is possible that these samples contain metal hydroxide precipitates. It is unclear in these systems if the active catalyst is a transition metal ion in the zeolite cages or a metal hydroxide layer. Generally, and while not theory-bound, it is believed that the lack of hydroxide precipitates and framework degradation in the PEG exchanged samples disclosed here yields more catalytically active transition metal sites.

We claim:

1. A process for exchanging cations in an aluminosilicate, comprising:
   a. providing an ion-exchangeable aluminosilicate comprising a zeolite or a sodalite and a first cation associated with the zeolite or the sodalite as a counter ion;
   b. providing a second cation source comprising a second cation different from the first cation, wherein the second cation is selected from an alkali metal, an alkaline earth metal, an actinide, aluminum, gallium, indium, thallium, silicon, germanium, tin, lead, arsenic, antimony, and bismuth;
   c. providing an exchange solvent comprising a polyalkylene oxide glycol, a polyalkylene oxide glycol monoether, a polyalkylene oxide glycol diether, or any combination thereof; and
   d. combining the ion-exchangeable aluminosilicate and the second cation source in the exchange solvent under ion exchange conditions, to provide a mixture comprising the ion-exchanged aluminosilicate comprising the second cation associated with the zeolite or the sodalite as a counter ion;
   wherein:
   when the aluminosilicate comprises Zeolite Y, the second cation source comprises a cation different from $Li^+$;
   when the aluminosilicate comprises Zeolite ZMS-5, the second cation source comprises a cation different from $Li^+$; and
   when the aluminosilicate comprises Zeolite L, the second cation source comprises a cation different from $Ba^{2+}$.

2. The process according to claim 1, further comprising isolating the ion-exchanged aluminosilicate from step d, and repeating steps a through d any number of times using the isolated ion-exchanged aluminosilicate, to provide a new ion-exchanged aluminosilicate comprising the second cation associated with the aluminosilicate as a counter ion.

3. The process according to claim 1, wherein the exchange solvent comprises a polyether having the formula:

$R^1O[(CH_2)_mCHR^2O]_nR^1$, wherein

$R^1$ in each occurrence is H or a $C_1$-$C_{12}$ alkyl;
$R^2$ in each occurrence is H or a $C_1$-$C_{12}$ alkyl;
m is an integer from 1 to 10, inclusive; and
n in each occurrence is an integer from 1 to 30, inclusive.

4. The process according to claim 1, wherein the exchange solvent comprises a polyalkylene oxide glycol having the formula $HO[CH_2CH_2O]_nH$, $HO[CH_2CHR^2O]_nH$, or any combination thereof, wherein:
   $R^2$ in each occurrence is a $C_1$-$C_{12}$ alkyl; and
   n in each occurrence is an integer from 1 to 30, inclusive.

5. The process according to claim 1, wherein the exchange solvent comprises a polyalkylene oxide glycol monoether having the formula $HO[CH_2CH_2O]_nR^1$, $HO[CH_2CHR^2O]_nR^1$, or any combination thereof, wherein:
   $R^1$ in each occurrence is a $C_1$-$C_{12}$ alkyl;
   $R^2$ in each occurrence is a $C_1$-$C_{12}$ alkyl; and
   n in each occurrence is an integer from 1 to 30, inclusive.

6. The process according to claim 1, wherein the exchange solvent comprises a polyalkylene oxide glycol diether having the formula $R^1O[CH_2CH_2O]_nR^1$, $R^1O[CH_2CHR^2O]_nR^1$, or any combination thereof, wherein:
   $R^1$ in each occurrence is a $C_1$-$C_{12}$ alkyl;
   $R^2$ in each occurrence is a $C_1$-$C_{12}$ alkyl; and
   n in each occurrence is an integer from 1 to 30, inclusive.

7. The process according to claim 1, wherein the exchange solvent is selected from $HO[CH_2CH_2O]_nH$, $HO[CH_2CH_2O]_nCH_3$, $H_3CO[CH_2CH_2O]_nCH_3$, $HO[CH_2CHCH_3O]_nH$, $HO[CH_2CHCH_3O]_nCH_3$, $H_3CO[CH_2CCH_3O]_nCH_3$, or any combination thereof, wherein the average value of n in each occurrence is independently from about 1 to about 30.

8. The process according to claim 1, wherein the exchange solvent comprises a polyethylene oxide glycol selected from polyethylene glycol 200, polyethylene glycol 300, polyethylene glycol 400, polyethylene glycol 600, polyethylene glycol 1000, polyethylene glycol 1450, polyethylene glycol 3350, polyethylene glycol 4000, polypropylene glycol 400, polyethylene glycol methyl ether 750, or any combination thereof.

9. The process according to claim 1, wherein the exchange solvent comprises
   polypropylene oxide glycols having a molecular weight of 1000, 1200, 2000, 3000, or 4000, including any combination thereof;
   polyglycol copolymers having a molecular weight of 2000, 2250, 2500, 2600, or 3900, including any combination thereof; or
   glyceryl ether polymers having a molecular weight of 250, 700, 3000, or any combination thereof.

10. The process according to claim 1, wherein the exchange solvent comprises a polypropylene oxide-1,3-glycol, a polybutylene oxide-1,2-glycol, a polybutylene oxide-1,4-glycol, a poly-pentylene oxide-1,2-glycol, a poly-hexamethylene oxide-1,6-glycol, a polyheptamethylene oxide-1,7-glycol, a polyoctamethylene oxide-1,8-glycol, a polynonamethylene oxide-1,9-glycol, or any combination thereof.

11. The process according to claim 1, wherein the exchange solvent comprises monoethylene glycol dimethyl ether (monoglyme), diethylene glycol dimethyl ether (diglyme), triethylene glycol dimethyl ether (triglyme), tetraethylene glycol dimethyl ether (tetraglyme), pentaglyme, hexaglyme, polyglycol DME 200, polyglycol DME 250, polyglycol DME 500, polyglycol DME 1000, polyglycol DME 2000, diethylene glycol dibutyl ether, polyethylene glycol dibutyl ether MW 300, or a combinations thereof.

12. The process according to claim 1, wherein the ion-exchangable aluminosilicate comprises an aluminosilicate selected from analcime, brewsterite, chabazite, clinoptilolite, erionite, faujasite, ferrierite, gismondine, gmelinite, mesolite, mordenite, natrolite, offretite, phillipsite, paulingite, scolecite, stilbite, thomsonite, Zeolite A, Zeolite B, Zeolite F, Zeolite H, Zeolite L, Zeolite T, Zeolite W, Zeolite X, Zeolite Y, Zeolite Omega, Zeolite ZSM-5, Zeolite ZSM-4, Zeolite P, Zeolite N, Zeolite D, Zeolite O, Zeolite S, or Zeolite Z.

13. The process according to claim 1, wherein the second cation source comprises an alkali metal, an alkaline earth metal, an actinide metal, any complex cations thereof, or any combination thereof.

14. The process according to claim 1, wherein the cation source comprises a compound of Th, U, Li, K, Rb, Cs, Be, Mg, Ca, Sr, Ba, Al, Ga, In, Tl, Ge, Sn, Pb, or any combination thereof.

15. The process according to claim 1, wherein the second cation source comprises a complex having the general formula $[ML_lX_x]^q$ wherein:
   M is in the x+q oxidation state;
   L, in each occurrence, is independently a neutral monodentate ligand;
   l is an integer from 0 to 7, inclusive;
   X, in each occurrence, is independently a monoanionic ligand;

x is an integer from 0 to 7, inclusive; and q is a charge from 0 to +4, inclusive.

16. The process according to claim 15, wherein at least one X is selected from fluoride, chloride, bromide, iodide, hydroxide, $C_1$-$C_{10}$ hydrocarbyloxide, cyano, or cyanate.

17. The process according to claim 15, wherein at least one L is selected from tetrahydrofuran (THF), furan, methyltetrahydrofuran, dihydrofuran, tetrahydropyran, 2,3-dihydropyran, 1,3-dioxane, 1,4-dioxane, morpholine, N-methylmorpholine, acetonitrile, propionitrile, butyronitrile, benzonitrile, dimethyl sulfoxide (DMSO), pyridine, amine ($NH_3$), $NH_2Me$, $NH_2Et$, $NHMe_2$, $NHEt_2$, $NMe_3$, $NEt_3$, $PMe_3$, $PEt_3$, $PPh_3$, $P(n-Bu)_3$, $P(OMe)_3$, $P(OEt)_3$, $P(O-n-Bu)_3$, methyl isocyanide, n-butyl isocyanide, phenyl isocyanide, carbonyl, $SMe_2$, thiophene, or tetrahydrothiophene (THT).

18. The process according to claim 1, wherein the second cation source is a compound of $Li^+$, $K^+$, $Mg^{2+}$.

19. The process according to claim 1, wherein the ion-exchangeable aluminosilicate and the second cation source are combined in an amount to provide a 0.1:1 to 100:1 molar ratio of second cation to first cation relative to a charge-balanced amount.

20. The process according to claim 1, wherein the mixture is heated to a temperature from about 50° C. up to the boiling point of the exchange solvent.

21. A process for exchanging cations in a zeolite, comprising:
a. providing a zeolite comprising a first cation associated with the zeolite as a counter ion;
b. providing a second cation source comprising a second cation different from the first cation, wherein the second cation is selected from an alkali metal, an alkaline earth metal, an actinide, aluminum, gallium, indium, thallium, silicon, germanium, tin, lead, arsenic, antimony, and bismuth;
c. providing an exchange solvent selected from polyethylene oxide glycol, polypropylene oxide glycol, polyethylene oxide glycol methyl ether, polyethylene oxide glycol dimethyl ether, glyme, diglyme, or tetraglyme; and
d. combining the ion-exchangeable zeolite and the second cation source in the exchange solvent under ion exchange conditions, to provide a mixture comprising the ion-exchanged zeolite comprising the second cation associated with the zeolite as a counter ion;

wherein:
when the aluminosilicate comprises Zeolite Y, the second cation source comprises a cation different from $Li^+$;
when the aluminosilicate comprises Zeolite ZMS-5, the second cation source comprises a cation different from $Li^+$; and
when the aluminosilicate comprises Zeolite L, the second cation source comprises a cation different from $Ba^{2+}$.

22. The process according to claim 21, wherein the second cation source is a compound of $Li^+$ or $Mg^{2+}$.

* * * * *